April 17, 1962
A. H. FOTSCH ETAL
3,029,710
MACHINE TOOL
Filed Aug. 5, 1957
6 Sheets-Sheet 1
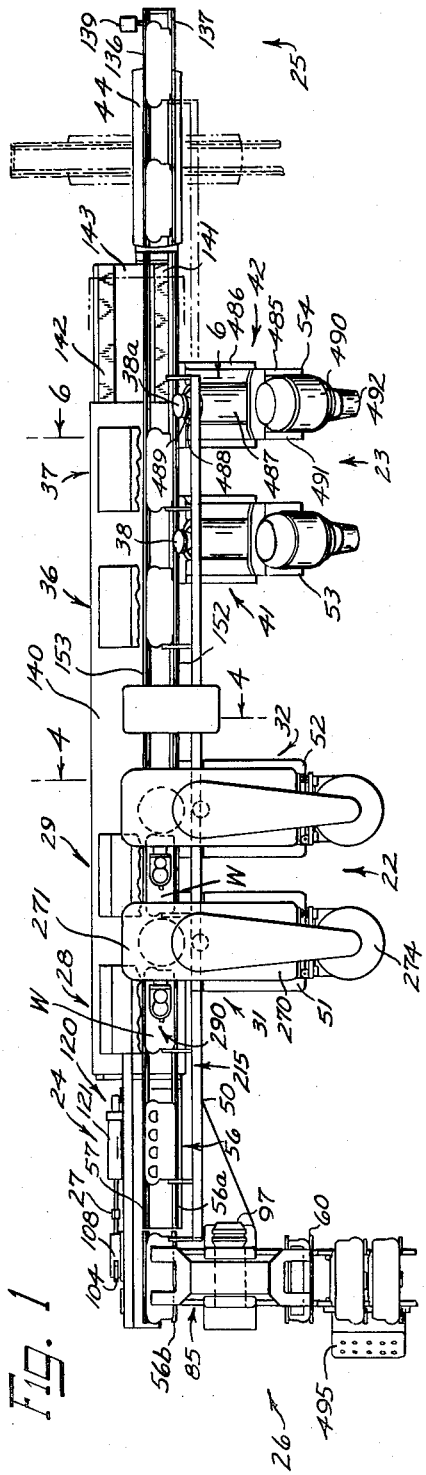
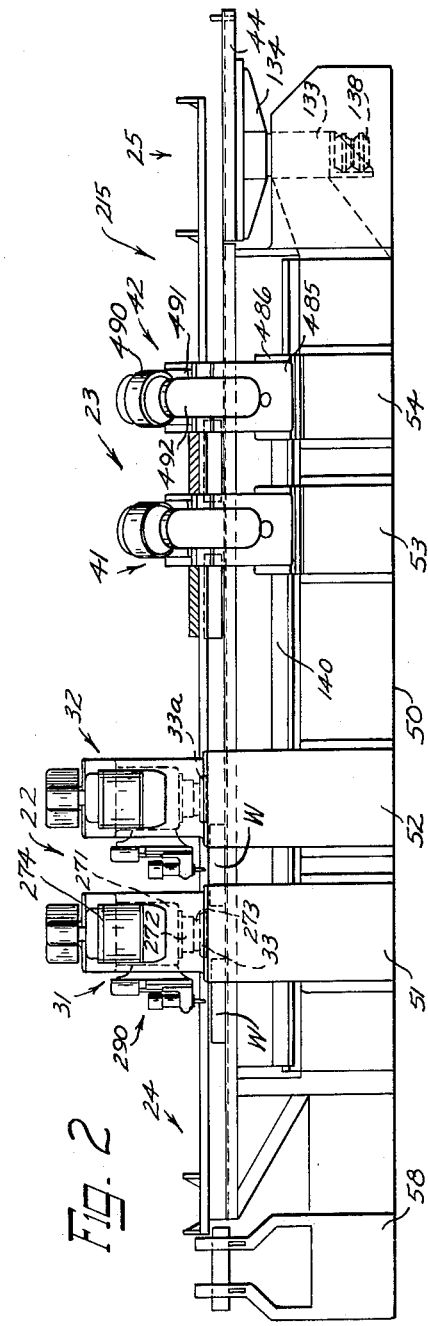
INVENTORS.
Arthur H. Fotsch
William P. Bartz
Frank J. Schalk
BY
Erwin J. Wutschel
Attorney

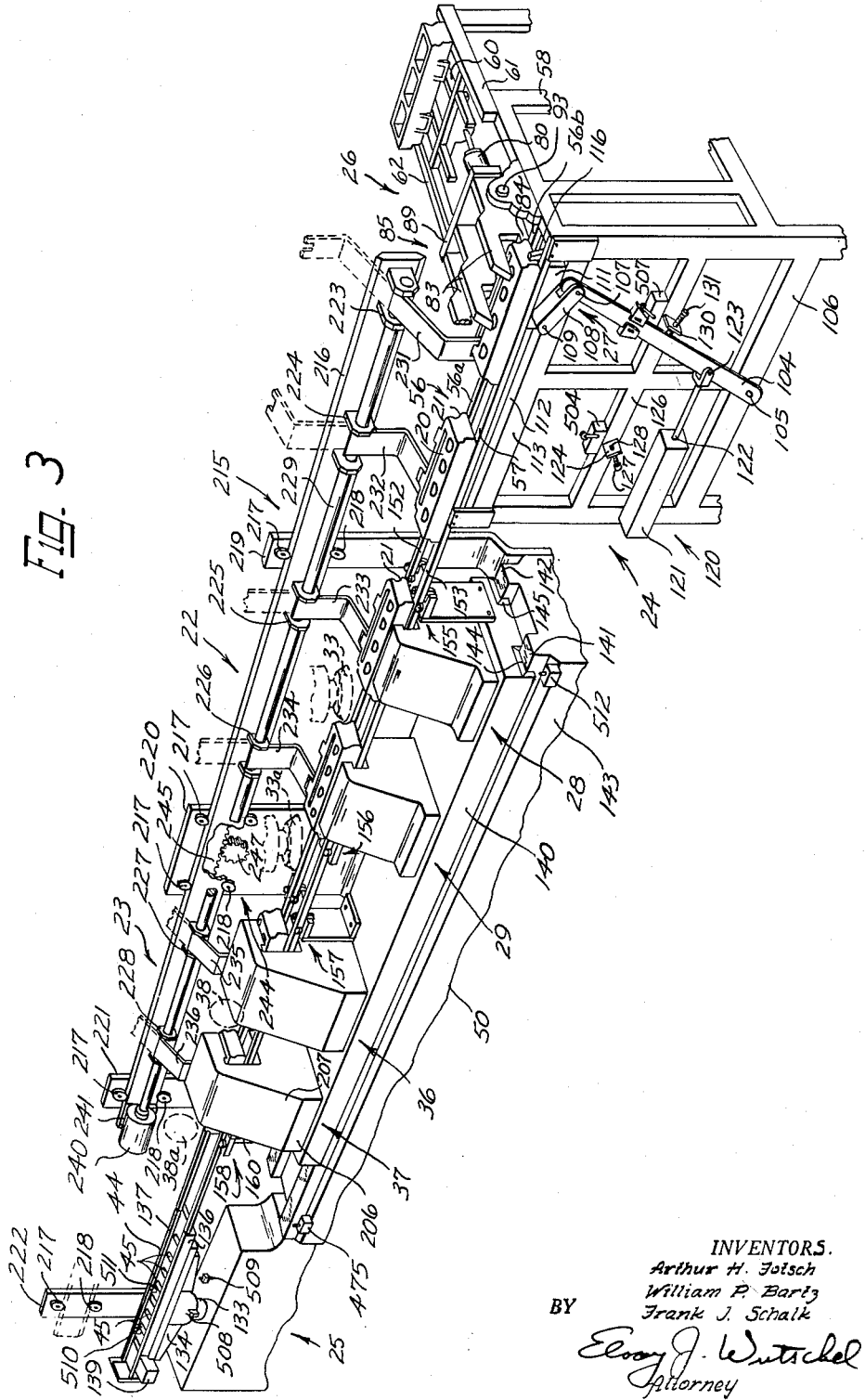

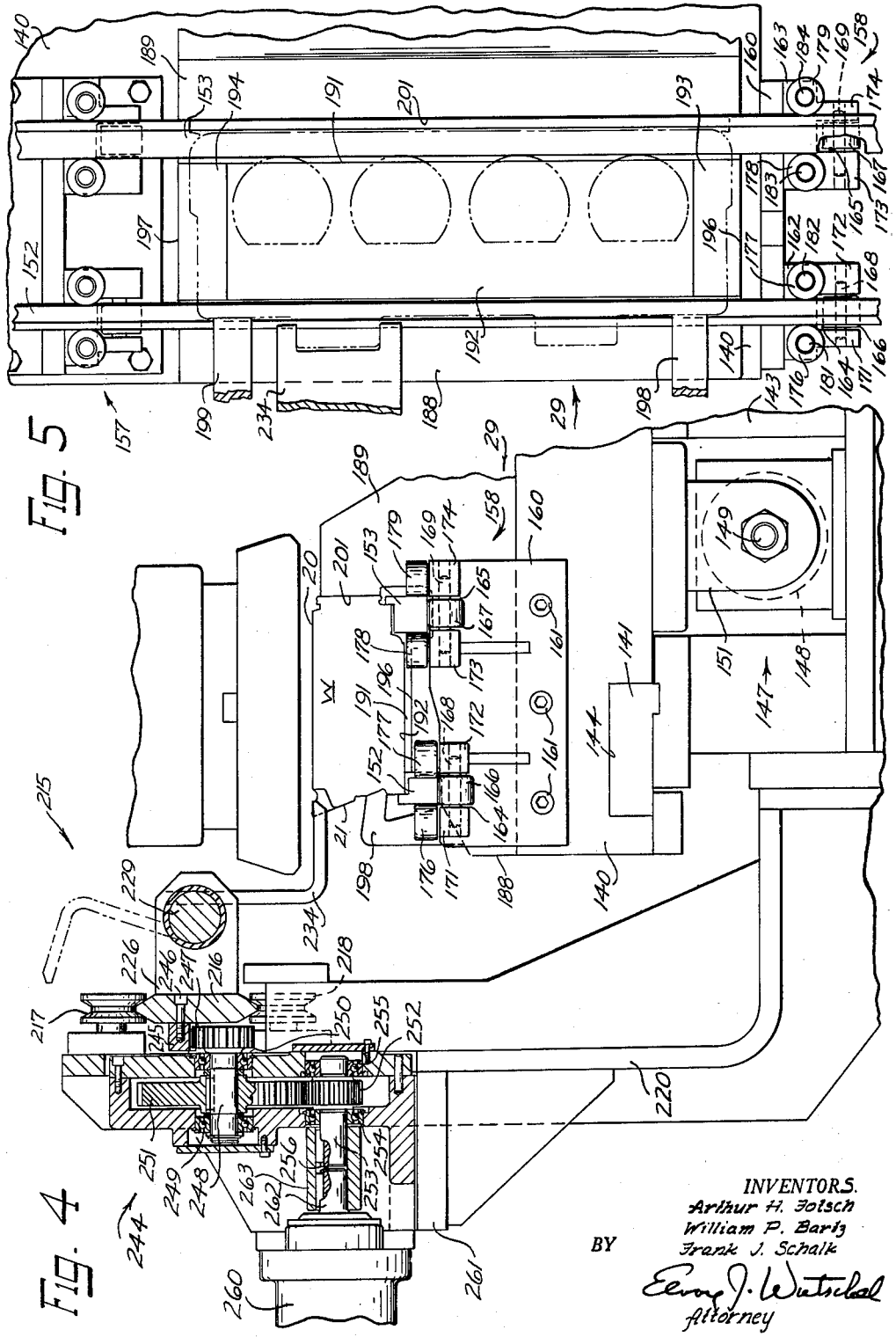

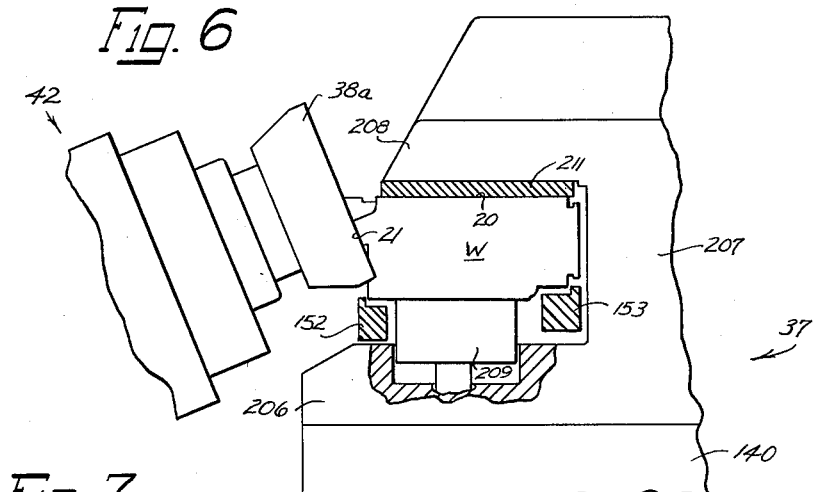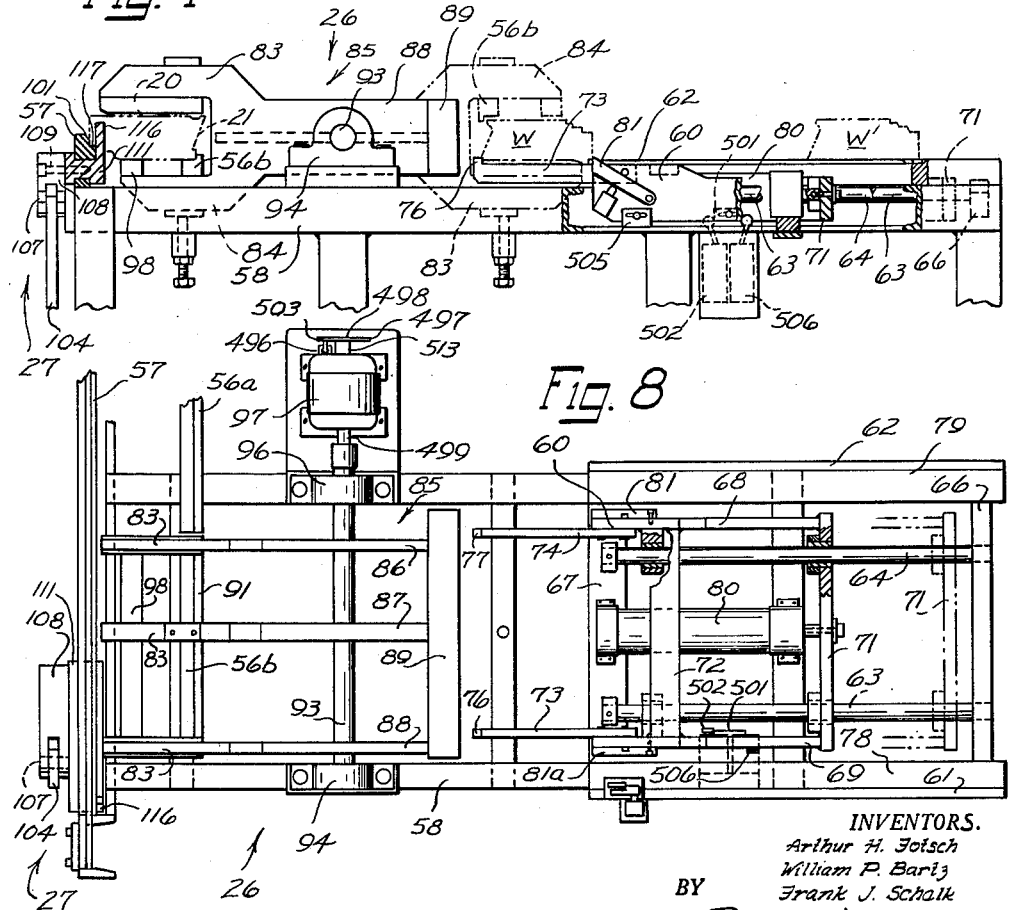

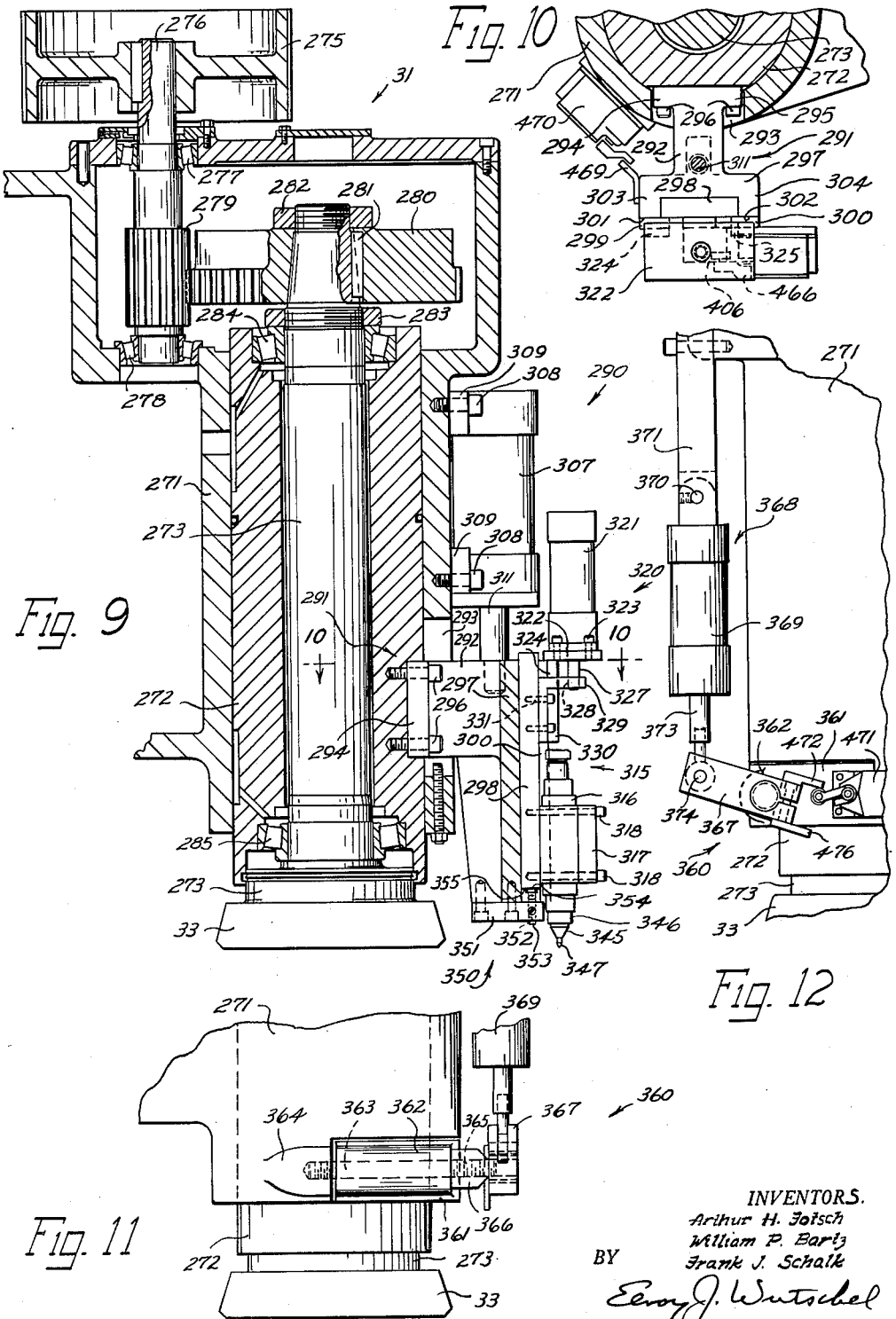

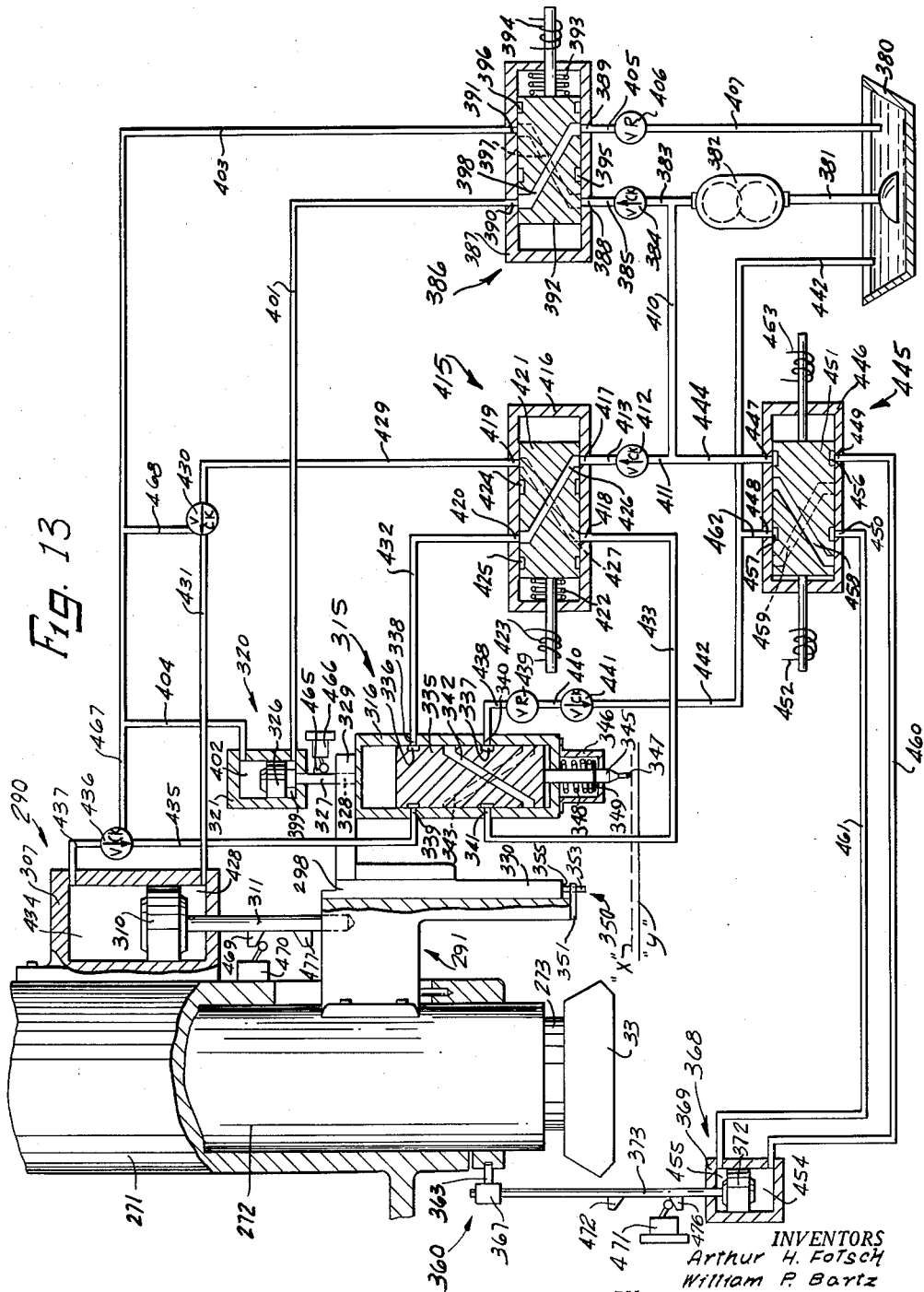

United States Patent Office 3,029,710
Patented Apr. 17, 1962

3,029,710
MACHINE TOOL

Arthur H. Fotsch, Wauwatosa, and William P. Bartz and Frank J. Schalk, Milwaukee, Wis., assignors to Kearney & Trecker Corporation, West Allis, Wis., a corporation of Wisconsin
Filed Aug. 5, 1957, Ser. No. 676,324
12 Claims. (Cl. 90—16)

This invention relates generally to machine tools and in some of its aspects has more particular reference to a machine tool organization in which a plurality of workpieces are transferred along a line of work stations successively whereat a series of machining operations are performed on several workpieces simultaneously.

A general object of the present invention is to provide an improved milling machine in which the workpieces are advanced successively through a plurality of work stations to have different machining operations performed on them.

Another object of the present invention is to provide an improved machine tool organization wherein several similar workpieces may be automatically loaded and oriented in the desired work position and the workpieces are transferred automatically through a plurality of work stations and then, after the machining operations have been completed, are delivered to a receiving station from whence they are removed from the machine.

Another object of the present invention is to provide an improved transfer mechanism capable of transferring a plurality of similar workpieces arranged in groups from a loading station to a plurality of work stations successively and thence to a receiving station.

Still another object of the invention is to provide a tool unit adapted to be automatically positioned to a predetermined desired position relative to a workpiece.

A further object of the present invention is to provide a tool unit capable of automatically performing the same operation upon a plurality of similar workpieces.

Another object of the present invention is to provide a tool unit capable of automatically positioning itself relative to a plurality of similar workpieces to accurately perform the same operation upon successive workpieces despite a variation in dimension of the workpieces.

Still another object of the present invention is to provide a tool unit having a positionable cutter and a gauge mechanism associated with the cutter which is capable of positioning the cutter to a desired position relative to each workpiece so that the same operation may be accurately performed on successive workpieces.

Another object of the present invention is to provide an improved construction of work transfer mechanism which occupies a minimum of space and is actuated by a combination of hydraulic and mechanical means to provide a smooth and positive operation.

Another object of the present invention is to provide a tool unit having means for automatically positioning the cutting tool thereof in a predetermined desired position relative to the workpiece to be operated upon as established by the dimension of each individual workpiece.

Still another object of the invention is to provide novel means for supporting workpiece guiding means.

Yet another object of the invention is to provide transient lateral and bottom supporting means for supporting a pair of workpiece guide rails in parallel straight line relationship.

According to this invention there is provided an improved milling machine especially adapted for performing several operations on workpieces at separate stations, wherein the workpieces are automatically loaded and positioned in the machine and are automatically moved through the machine and delivered to a predetermined location, without being handled by the operator. In the present embodiment, two operations are performed on two groups of workpieces successively with separate operations upon two groups of workpieces being performed simultaneously. The workpieces are transferred through the machine on a pair of guide rails disposed in operating relationship with two groups of relatively stationary spindle head units which rotatably support appropriate cutters. The workpieces are placed on the guide rails by a loading mechanism which receives the workpieces and is automatically operable to place the workpieces in the desired oriented position in the loading station. After one workpiece has been placed on the guide rails in the loading station, a shuttle mechanism advances the first of the workpieces to a lead position making room for another workpiece. Simultaneously with the operation of the loading mechanism, workpiece receiving fixtures, at the two work stations, carried by a movable table, are actuated to raise the workpieces therein off of the guide rails and to clamp the workpieces in a work position. The workpieces are advanced into the several stations successively by action of a transfer mechanism. The transfer mechanism is adapted to move workpieces in groups from the loading station into the first work station, and from the first work station into the succeeding or last work station, and from the last work station into the receiving and delivery station. Also, occurring simultaneously with the operation in the loading station and the work stations, the receiving and delivery station is in operation to rotate the receiving station conveyor to a desired delivery point. When the conveyer has been moved to the delivery point, the rollers of the conveyer are actuated to move the workpieces off of the conveyer to the delivery point. The removal of the workpieces off of the conveyer initiates the return of the conveyer back into alignment wtih the machine for receiving additional workpieces.

After the above described actions have been completed, the tool units in the work stations are actuated to position the cutting tool of the tool unit into a work operation position. The work to be performed on the workpieces when in the first work station is a precision operation, in that the material to be removed from the workpieces therein must be the same for all workpieces regardless of a variation in the dimensions of individual workpieces. It is therefore necessary that the cutting tools of the tool unit in this station be precisely positioned to the desired position relative to individual workpieces. To this end, a gauging mechanism is associated with each of the cutters of the tool units and is operable to control the advancement of the cutters into a desired position relative to each individual workpiece.

Upon the positioning of the cutters of the tool units in both work stations in a work position, the workpieces are fed past the cutting tools so that the work operation may be performed on them. After the work operation has been completed, the cutting tools are retracted and the workpieces returned by retraction of the table carrying the work fixtures. The workpieces are then unclamped and the transfer mechanism is actuated to advance the workpieces simultaneously, in groups.

The workpieces are guided in the transfer movement by means of parallelly disposed guide rails which extend between the loading station and the delivery station. The guide rails being connected at their ends to the machine tool in a manner that they extend through the work receiving fixtures without contact therewith. Thus, featuring a non-interfering guiding structure permitting clear unobstructed access to the workpieces thereon. To maintain the guide rails in aligned parallel relationship, a plurality of spaced transient bottom and lateral supports are provided. The transient supports are secured to the table to move with it and are arranged to impart their supporting function to the rails below the level of the workpieces. In this manner, the workpieces may be freely progressed through the machine tool without the obstructing structure usually associated therewith.

The foregoing and other objects of this invention will become more fully apparent from the following detailed description and may be achieved by the exemplifying apparatus depicted in and described in detail in connection with the accompanying drawings in which:

FIGURE 1 is a plan view of a milling machine embodying the features of the present invention;

FIG. 2 is a front elevational view of the machine illustrated in FIG. 1;

FIG. 3 is a fragmentary diagrammatic perspective view of the machine tool of FIG. 1, showing the loading and shuttle bar mechanism at the loading station, the transfer mechanism, the guide rail structure and table arrangement, the loading and the receiving stations;

FIG. 4 is an enlarged fragmentary transverse view partly in section and partly in elevation through the machine taken generally in the plane represented by the line 4—4 in FIG. 1, showing the drive connection for actuating the transfer mechanism and a work holder and rail support;

FIG. 5 is an enlarged fragmentary plan view of the workpiece guide rails showing the arrangement of the guide rail supports;

FIG. 6 is an enlarged fragmentary detailed transverse view in elevation of one of the work fixtures of the second work station taken generally in the plane represented by the line 6—6 in FIG. 1, showing the workpiece guide rails and the elevating means for raising the workpiece off of the rails;

FIG. 7 is an enlarged fragmentary detailed view of the left end of the machine tool of FIG. 1, in front elevation with parts broken away to show the carriage for automatically inserting a workpiece in the loading arm;

FIG. 8 is an enlarged fragmentary plan view of the loading arm and carriage shown in FIG. 7;

FIG. 9 is an enlarged fragmentary view partly in vertical section and partly in front elevation of one of the tool heads showing the gauging mechanism connected thereto for precisely positioning the cutter;

FIG. 10 is an enlarged fragmentary view in horizontal section of the tool unit in FIG. 9 taken in a plane generally represented by the line 10—10 in FIG. 9;

FIG. 11 is an enlarged fragmentary view of the tool unit quill housing adjacent the cutter showing the mechanical clamping arrangement for clamping the quill;

FIG. 12 is another enlarged fragmentary view in side elevation of the mechanical clamping arrangement for the quill shown in FIG. 9; and, FIG. 13 is a diagrammatic view of the tool unit shown in FIG. 9, with the associated gauge mechanism and illustrating the hydraulic circuit for automatically actuating the gauge mechanism and the quill.

For the purpose of illustration, the invention has been shown in the drawings as an organizaiton for finish milling a joint surface 20 and a side pad 21 of a head W of an internal combustion engine as shown in FIG. 3. It is to be understood, however, that the invention is not limited to this type of workpiece or to a particular type of metal removing operation performed thereon, but is adaptable for performing diverse machining operations on a variety of workpieces.

The exemplary embodiment of the invention shown involves the performance of a series of finish milling operations on the workpieces W while the latter are held in groups of two at separate work stations generally denoted at 22 and 23 which are located intermediately of a loading station 24 and a receiving and delivery station 25.

The loading station 24 is adapted to automatically receive a pair of workpieces W which are placed therein in a work oriented position by a loading mechanism generally denoted by the reference numeral 26. The loading mechanism 26 receives workpieces from a source (not shown) and is automatically operable to position the workpieces in the loading station in the work oriented position. A shuttle bar mechanism 27 associated with the loading station 24 is operative to engage and position the first of the workpieces, delivered by the loading mechanism to the loading station, in an advanced spaced position to make room for another workpiece thereon.

The workpieces in the loading station 24 are transferred as a group intermittently along a horizontal guideway, being advanced, in the present instance, endwise into the work station 22 where they come to rest and are securely clamped in spaced fixtures 28 and 29. The work station 22 generally comprises two spaced vertical tool units 31 and 32 that are arranged to operate simultaneously on separate workpieces to remove a precise amount of material to finish the joint surface 20 of the workpiece W. The cutters 33 and 33a of the tool units 31 and 32, respectively, are adapted to be automatically and precisely located relative to an associated workpiece in a manner that the same amount of material is removed from each workpiece regardless of a variation in the vertical overall dimensions of the several workpieces presented. The workpieces W advanced into the respective fixtures 28 and 29 will be positioned so that each will be located to the right of the respective cutters 33 and 33a, as shown in FIG. 3, or to the left, as viewed in FIGS. 1 and 2.

The two workpieces in the work station 22 are next transferred to the succeeding work station 23 and simultaneously therewith two new workpieces are transferred into the station 22. At the work station 23 the workpieces are again moved into spaced fixtures 36 and 37 and are securely clamped therein for operation upon by cutters 38 and 38a of tool units 41 and 42, respectively, to finish mill the side pad 21 of the workpieces.

The workpieces are next transferred by pairs into the receiving and delivery station 25, while the workpieces in stations 22 and 24 are simultaneously advanced to the respective succeeding adjacent stations. The receiving station 25 generally comprises, a conveyer 44 having a plurality of rollers 45. The conveyer 44 is adapted to be bodily rotated 90° from the line of transfer, as indicated by the dotted lines of FIG. 1. Upon being rotated to the position indicated, the rollers 45 are rotated to move the workpieces off of the conveyor to a delivery point or area (not shown).

Referring more specifically to the drawings and more particularly to FIGS. 1 and 2 thereof, the invention is shown embodied in a milling machine comprising, in general, an elongated frame 50 having four laterally extending frame extensions 51, 52, 53 and 54. The frame extensions 51 and 52 are disposed together at the work station 22, while the frames 53 and 54 are, grouped together at the work station 23. At the left end of the frame 50, as viewed in FIGS. 1 and 2, the frame rigidly supports a pair of guide rails 56 and 57 which receive the workpieces W in work oriented position from the loading mechanism 26.

The loading mechanism 26, generally comprises a laterally extending frame extension 58 on which is slidably mounted a carriage 60, as best shown in FIGS. 3, 7 and 8. The carriage 60 is reciprocable between a pair of workpiece supporting rails 61 and 62, which are constructed as a part of the frame extension 58. The carriage 60 is supported and guided in its path of travel by a pair of guide bars 63 and 64 fixedly secured to cross members 66 and 67 of the frame extension 58. The carriage 60 comprises a pair of side members 68 and 69 and a pair of transverse members 71 and 72 secured to the side members, as shown in FIG. 8. The side members 68 and 69 each have secured to them forwardly extending arm members 73 and 74 which are provided with upwardly extending workpiece abutment tips 76 and 77, respectively. The abutment tips 76 and 77 serve as forward stops for a workpiece W, illustrated in broken lines in FIG. 7, moved on to the arms 73 and 74, as will be more fully described.

To reciprocate the carriage 60 in its path of travel from a retracted position, indicated by dotted lines in FIGS. 7 and 8, to its forward position as shown by full lines in these figures, a piston and cylinder mechanism 80 is secured to the frame extension 58 and is operably connected to actuate the carriage 60. The carriage 60 in the retracted position is operable to receive a workpiece W', supplied to a pair of supporting surfaces 78 and 79 of the rails 61 and 62, respectively, from a source (not shown). To this end, the carriage 60 is so constructed and arranged that it moves under the workpiece W' upon being retracted. Upon retraction of the carriage, another workpiece (not shown) is supplied to the rails 61 and 62 from the source (not shown). The second workpiece (not shown) moves the workpiece W' along the rails 61 and 62 on to the arms 73 and 74 of the carriage and against the abutment tips 76 and 77 of the arms. The workpiece W' in passing along the rails 61 and 62 on to the arms 73 and 74 depresses a pair of upwardly biased stop lugs 81 and 81a which snap up behind the workpiece after the latter has passed to prevent displacement of the workpiece from its position on the arms, as shown in FIG. 7. The carriage 60 upon being moved to its forward position is operable to insert the workpiece between an upper and a lower finger, 83 and 84 respectively, of a loading arm generally identified by the reference numeral 85 and clearly illustrated in FIG. 7.

The loading arm 85 comprises three spaced apart members 86, 87 and 88 which are rigidly secured together at one end by a cross member 89 and at the workpiece receiving end by another cross member 91. The members 86, 87 and 88 at their forward ends are formed so as to have bifurcated ends which constitute the upper and lower fingers 83 and 84 of the arm. As can be seen in FIG. 7, the lower fingers 84 are somewhat shorter than the upper fingers 83. For this reason, the lower fingers do not contact the outer guide rail 57 when the arm is pivoted into its placement position and the outer edge of the workpiece is freely placeable on the guide rail 57. The members 86 and 88 of the arm 85 are disposed so that when the arm is in a receiving position, the members 86 and 88 thereof are positioned to the same side of the arms 73 and 74 of the carriage 60. The loading arm 85 is supported on the frame 58 for pivotal movement, in a vertical plane, from the receiving position indicated on dotted lines in FIG. 7, to a placement position, shown in full lines in FIGS. 1, 7 and 8. For this purpose, the members 86, 87 and 88 are secured to a shaft 93 rotatably journalled in pillow blocks 94 and 96 secured to the frame 58. A reversible motor 97, which we prefer to be hydraulic, is secured to the side of the frame 58 and is operably connected to actuate the shaft 93 to pivot the arm 85 to either of its two positions. It is therefore apparent that the arm 85 is free to lift the workpiece off of the arms 73 and 74 whenever the motor 97 is operated to pivotally move the arm to its placement position.

As best shown in FIGS. 1, 7 and 8 the guide rail 56 within the loading station 24 is constructed in two sections, a forward section 56a and a rear section 56b. The rear section 56b is secured to the lower fingers 84 of the arm 85 for movement with it and serves as a workpiece locating abutment when the arm 85 is in position to receive a workpiece from the carriage 60, as clearly shown in FIG. 7. At their outer ends the lower fingers 84 have secured to them a flat bearing plate 98 that serves as an equalizing support for carrying the workpiece within the fingers when the arm 85 is pivoted to place the workpiece in the loading station. As shown in FIG. 7, the guide rail 57 is provided with a sloping inner surface 101 which extends from the top of the rail to the vertical guide surface thereof. The sloping surface 101 of the guide rail 57 will serve to insure positive positioning of the workpiece W between the vertical guiding surfaces of the rail 57 and the rail section 56b, in the event that the workpiece should be somewhat displaced during the pivotal movement of the arm 85 from its receiving position to its placement position. That is, should the workpiece be moved outwardly of the fingers 83 and 84 from the normal position, as illustrated in FIG. 7, the outer lower edge of the workpiece will contact the sloping surface 101 and thereby be moved inwardly back into the normal position.

The workpiece W, when placed in position on the guide rails 56 and 57 in the loading station 24, is moved to a forward or advance position therein in order that another workpiece may be placed on the rails by the loading mechanism. To advance the workpiece to a forward position in the loading station 24, the shuttle mechanism 27 is operable to engage the workpiece W in the rear position in the loading station and to move it out of the fingers 83 and 84 of the loading mechanism 26. The shuttle mechanism, as best shown in FIGS. 3 and 7, comprises an arm 104 pivotally secured at its lower end, as at 105, to a cross member 106 of the frame 50. The upper end of the arm 104 has pivotally secured to it, as at 107, a link 108. The link 108 at its opposite end is, in turn, pivotally secured, as at 109, to a slide block 111 slidably supported on the top surface 112 of a horizontal member 113 of the frame 50. The slide block 111 is also slidably engaged with the bottom surface of the guide rail 57. The arrangement is such that the slide block 111 is slidably retained in the horizontal plane by the frame member 113 and the guide rail 57. To the inner side surface of the slide block 111 there is secured a workpiece engaging lug 116 which is of a length so as to extend a sufficient distance above the horizontal supporting surface 117 of the guide rail 57 to adequately engage the rear surface of the workpiece W, as shown in FIG. 7. The lug 116 is also sufficiently long to extend down along the inner side surface of the horizontal member 113. In this manner the lug 116 serves to restrain the slide block 111 from moving outwardly and the link 108 cooperates to restrain the slide block from moving inwardly to effectively maintain the slide block 111 in its operative position.

A fluid actuator 120 is provided to propel the slide block 111 for advancing the workpiece to a forward position. The actuator 120 comprises a cylinder 121 secured to the frame 50 having a piston (not shown) reciprocally supported within it. The piston (not shown) has a rod 122 extending outwardly of the cylinder 121 with its free end pivotally connected to the arm 104, as at 123. By actuating the piston (not shown) leftwardly, as viewed in FIG. 3, within the cylinder 121, a movement of the slide block 111 leftwardly will occur to thereby move the workpiece to a forward position in the loading station 24. To insure that the workpiece W will be moved to the proper forward position, an adjustable positive stop has been provided which comprises a bracket 124 secured to a structural cross member 126 of the frame 50. An adjusting stud 127 is threadedly engaged in the bracket 124 in position so that its extending abutment end 128 is in position to be engaged by the arm 104. By adjusting the stud 127 the limit of leftward movement of the slide block 111 may be regulated to thereby effect a desired positioning of the workpiece W in a desired forward position in the loading station 24. Likewise, another positive stop is provided comprising a bracket 130 which is secured to the cross member 126 and having an adjustable abutment stud 131 threadedly engaged therein in position to be engaged by the arm 104 when in a retracted position, as shown in FIG. 3. This stop prevents the slide block 111 and the lug 116 from forcefully contacting the rear portion of the frame when the arm 104 is moved to the right. The stud 131 being adjustable in the bracket 130 also enables the lug 116, when in the retracted position, to be positioned so as to accommodate different types of workpieces which may be longer or shorter than the workpieces shown.

The receiving and delivery station 25 which is located at the right end of the frame 50, as viewed in FIGS. 1 and 2 or at the end of the machine frame at the left side of the drawing as the machine is illustrated in FIG. 3, comprises in general a vertical shaft 133 which is rotatably supported by the frame 50. Secured to the upper end of the shaft 133 for rotation with it is a supporting frame 134. Secured to the top of the supporting frame 134 is the conveyor 44 having a plurality of power actuated rollers 45. A pair of side portions 136 and 137 of the conveyer rotatably support the rollers 45 and also serve as guide rails for maintaining the workpieces W thereon. A motor 138, shown in dotted lines in FIG. 2, is operably connected to rotate the shaft 133 to turn the conveyer 44 from an aligned position, shown in full lines in FIGS. 1, 2 and 3, to a position 90° therefrom, as indicated by broken lines in FIG. 1. Another motor 139 is mounted on the side of the side rail 136 of the conveyor 44 and is operatively connected to rotate the rollers 45, in a well known manner. By this means the completed workpieces positioned on the conveyer 44 may be delivered to a desired area without the aid of an operator.

Intermediate of the loading station 24 and the receiving station 25 there is supported an elongated reciprocal table 140. The table 140 is guided for reciprocal movement between the stations 24 and 25 by a pair of ways 141 and 142, secured to or integrally formed on a table supporting base 143 of the frame 50, which cooperate with complementary guideways 144 and 145 provided on the underside of the table. The table 140 will operate to advance the workpieces past the cutters 33, 33a, 38 and 38a of the respective tool units 31, 32, 41 and 42 so that the desired work operation will be performed on the workpieces. To reciprocate the table 140 on the base 143 there is provided a fluid actuator 147, best shown in FIG. 4, comprising a cylinder 148 secured to the frame 50 and having a piston (not shown) reciprocable therein. A piston rod 149 secured to the piston (not shown) extends outwardly of the cylinder 148 and has its extending end secured to a depending bracket 151. The bracket 151 is secured to the bottom surface of the table 140, as shown in FIG. 4.

Extending between the loading station 24 and the receiving station 25 are a pair of continuous guide rails 152 and 153 that freely span the intermediate area between the stations 24 and 25 and are in effect portions or continuations of the guide rails 56 and 57, respectively, of the loading station 24 to cooperate therewith as well as with the guide rails 136 and 137 of the conveyer 44. The guide rails 152 and 153 are rigidly secured at their ends to the frame 50, as shown in FIGS. 1 and 3, so that they are stationary and carry and guide the workpieces from the loading station 24 through the work stations 22 and 23 to the receiving station 25. The rails 152 and 153 extend through the work fixtures 28, 29, 36 and 37 but are not supported therein. Since the guide rails 152 and 153 are not supported through their entire length by the frame 50 or by the work fixtures, a novel supporting arrangement has been provided, which will not interfere with the various moving parts of the machine tool. As best shown in FIGS. 3, 4 and 5, a plurality of transient lateral and bottom supports, generally denoted at 155, 156, 157 and 158, are provided and are secured to the table to move with it and are spaced, as shown in FIG. 3. The supports are effective to maintain the guide rails 152 and 153 in spaced parallel and aligned position.

Since the transient supports are identical, except for a minor variation in the mounting bracket, a detailed description of one will suffice for all of the supports. As shown in FIGS. 4 and 5 the transient support 158 comprises a mounting bracket 160 which is secured to the end of the table 140 as by screws 161. Secured to the top of the bracket 160 and extending outwardly thereof are a pair of roller supports 162 and 163. The supports 162 and 163 are each provided with a recess or slot 164 and 165, respectively. Within each of the slots 164 and 165 are rotatably mounted antifriction rail bottom supporting rollers 166 and 167 respectively. The rollers 166 and 167 are journalled on shafts 168 and 169, respectively, which are supported in extending finger portions 171 and 172, and 173 and 174 of the supports 162 and 163, respectively. To the rear of the bottom rollers 166 and 167 there is provided a pair of lateral side supporting rollers 176 and 177, and 178 and 179 for each of the supports 162 and 163. The rollers 176, 177, 178 and 179 are each mounted on vertical shafts 181, 182, 183 and 184, respectively, that are mounted in the top of the supports 162 and 163, as shown in FIGS. 4 and 5. The arrangement is such that the bottom rollers 166 and 167 are disposed so as to support their respective rails 152 and 153 in the horizontal plane, while the rollers 176 and 177, and 178 and 179 maintain the rails in parellel relationship. Since the rail supports are secured to the table 140 for movement with it and act from the sides and bottom they afford a clear unobstructed access to the workpieces and likewise do not interfere with the movement of the workpieces nor with the operations of the fixtures.

The work fixtures 28, 29, 36 and 37 are secured to the top of the table 140 for movement with it and are disposed thereon in complementary relationship to the tool units 31, 32, 41 and 42, respectively. The work fixtures 28 and 29 are the same so that the following description will apply to both fixtures. As shown in FIG. 4, the fixture 29 comprises a body portion 188 having an upstanding side portion 189. The body portion 188 is provided with an elongated central island 191 disposed between the rails 152 and 153, the top surface 192 of the island 191 being raised to effect a lifting of the workpiece W off of the guide rails 152 and 153 when the workpiece has been moved into the fixture. Each end of the island portion 191 has ramps 193 and 194 as shown in FIG. 5, which slope upwardly from the outer edges 196 and 197 to the top surface 192 of the island 191. By means of the ramps 193 and 194 the workpiece W is elevated off of the bottom guide bearing surfaces of the rails to rest upon the top elevated surface 192 of the island 191. When the workpiece W is in position on the elevating island 191 a pair of spaced clamping fingers 198 and 199 are actuated, by mechanism (not shown), against the side of the workpiece W and act to firmly maintain the workpiece W against a vertical bearing pad 201 of the side portion 189 as well as to clamp the workpiece firmly to the island 191.

The work fixtures 36 and 37 are constructed in a somewhat different manner than are the fixtures 28 and 29, since the sides of the fixtures 36 and 37 adjacent the cutting tools must be open to accommodate the cutters 38 and 38a, as shown in FIGS. 3 and 6. Both of the fixtures 36 and 37 are identical so that a description of one will suffice for both. As shown in FIGS. 3 and 6, the work fixture 37 comprises in general a base 206 having an upstanding side portion 207 from which extends a horizontal roof portion 208. The guide rails 152 and 153 extend through the fixtures in an unsupported manner, as shown in FIG. 6 Operatively contained in the base portion 206 is an elevating piston 209 which is movable vertically and located intermediate of the guide rails 152 and 153. The piston 209 is hydraulically actuated by mechanism (not shown) into engagement with the bottom of the workpiece W and is operative to raise the workpiece off of the guide rails 152 and 153. In raising the workpiece W the piston 209 moves it upwardly a sufficient amount so that the top surface 20 thereof contacts a pad 211 on the underside of the roof portion 208 to effectively clamp the workpiece against it. In this manner, the workpieces, when in work position within the fixtures 36 and 37, are supported free of the guide rails 152 and 153, as are the workpieces in the fixtures 28 and 29.

To progress the workpieces from the loading station 24 into the work fixtures of the work stations 22 and 23 and to the receiving station 25 there is provided a transfer mechanism, generally denoted at 215 in FIG. 3, which is operative to move the workpieces in pairs to the succeeding station. As shown in FIG. 3, the transfer mechanism comprises an elongated primary bar 216 which is movable longitudinally of the frame 50. As shown in FIG. 3, the bar 216 is depicted in position to advance workpieces to next adjacent stations. The bar 216 is supported for movement between a plurality of upper rollers 217 and lower rollers 218 which are rotatably supported in spaced brackets 219, 220, 221 and 222. The bracket 220 is a double bracket, the reason for which will be more apparent later. The brackets 219, 220, 221 and 222 are secured to the side of the frame 50 and are upstanding therefrom extending above the guide rails 152 and 153 to support the transfer mechanism in a plane above and to the side of the work fixtures so that the angularly disposed cutters 38 and 38a in the work station 23 and the vertically disposed cutters 33 and 33a in the work station 22 have clear access to the sides and tops of the workpieces. The primary bar 216 is provided with a plurality of pairs of supporting lugs 223, 224, 225, 226, 227 and 228 which are secured to the side of the bar 216. The lugs extend inwardly toward the work fixtures at right angles to the bar 216 and rotatably support a relatively long secondary finger bar 229. Secured to the secondary bar 229 for rotation with it are a plurality of workpiece engaging fingers 231, 232, 233, 234, 235 and 236. The fingers 231, 232, 233, 234, 235 and 236 are disposed between the two lugs of each pair of the supporting lugs 223, 224, 225, 226, 227 and 228, respectively. In this manner the secondary bar 29 is restrained from axial movement relative to the primary bar 16 while free to rotate in the supporting lugs.

To rotate the secondary bar 229 so as to position the workpiece engaging fingers in engagement with the workpiece, as shown in FIG. 3, or to a disengaged position, as indicated by dotted lines, a reversible fluid motor 240 is provided. The fluid motor 240 is operably connected to the end of the secondary bar 229, as shown in FIG. 3, and is supported in position by a bracket 241 secured to the primary bar 216 in a manner so that the motor 240 moves with the bar 216.

To effect axial movement of the primary bar 216 there is provided a gear rack drive mechanism generally denoted at 244. As best shown in FIG. 4, the drive mechanism 244 comprises an elongated gear rack 245 secured to the back side of the primary bar 216, as by a plurality of screws 246, one of which is shown. A gear 247 secured to the extending end of a rotatable shaft 248 is disposed in constant meshing engagement with the gear rack 245. A gear 251 is keyed to rotate with a shaft 248 that is rotatably supported in the bracket 220 in a pair of antifriction bearings 249 and 250 mounted in the bracket 220. The gear 251 is in meshing engagement with a smaller drive gear 252 secured for rotation with another shaft 253. The shaft 253 is rotatably supported in a pair of antifriction bearings 254 and 255 carried in the bracket 220 and has one end 256 extending outwardly of the bracket. A fluid motor 260 supported on a bracket assembly 261, that is secured to the bracket 220, has an extending drive shaft 262 operably connected to the extending end 256 of the drive shaft 253 by means of a coupling 263.

As previously stated the workpieces W are transferred from the loading station 24 to the first work station 22 where a precision milling operation is performed on the joint surface 20 of the workpieces W. In this respect novel mechanism has been provided whereby the cutters 33 and 33a of the tool units 31 and 32, respectively, may be automatically advanced and positioned to a predetermined position relative to individual workpieces in a manner so that precisely the same amount of material may be removed from each workpiece regardless of a variation in the height dimensions of the workpieces. However, it will be understood that the tool units 31 and 32 are each provided with their own mechanism for effecting a positioning of their respective cutters 33 and 33a relative to the top surfaces of the workpieces that are located to the left of the cutters, as shown in FIGS. 1 and 2. Thus, as shown, the cutter positioning mechanisms are positioned so that they contact the top surfaces of the workpieces while the cutters 33 and 33a in being positioned relative to the top surfaces will not contact the workpieces until the table 140 is advanced to feed the workpieces to the cutters. Inasmuch as both tool units are identical only the tool unit 31 will be described.

As best shown in FIGS. 1 and 2, the tool unit 31 comprises a frame 270 secured to the top of the extension 51. Integrally formed with the frame and disposed on the front face thereof is a vertical quill housing 271 in which a quill 272 is supported for vertical axial movement. The quill 272 rotatably supports a vertically disposed spindle 273 having the cutter 33 secured thereto in a well known manner. An electric motor 274 is secured to the frame 270 and operates to drive the cutter 33 by means of a belt sheave 275, shown in FIG. 9, keyed to a shaft 276 that is journalled in the frame 271 by means of antifriction bearings 277 and 278, permitting the shaft to rotate freely. Power is transmitted from the drive shaft 276 to the cutter 33 by means of an elongated gear 279, secured to the drive shaft and engaging a flywheel gear 280. The gear 280 is mounted on the vertical spindle 273, being prevented from rotating relative to the spindle 273 by means of a key 281 and is fixed thereon by a collar nut 282. Another collar nut 283 serves to retain the spindle 273 within the quill 272 with the spindle 273 being rotatably supported therein by anti-friction bearings 284 and 285.

To advance the cutter 33 into a predetermined position relative to the top surface of an individual workpiece an actuating and control mechanism, generally identified by the reference numeral 290, is provided. As best shown in FIGS. 9 and 10, the mechanism comprises a bracket generally denoted at 291, having a horizontally extending arm portion 292. The arm portion 292 extends through an elongated opening 293 provided in the housing 271. The inner end of the arm portion 292 is provided with a pair of side flanges 294 and 295 through which a plurality of screws 296 are inserted to threadedly engage the quill 272, thereby securing the bracket 291 to the quill. The front face of the bracket 291 is provided with an elongated U-shaped slideway 297 in which a slide 298 is freely supported for vertical movement. The slide 298 is maintained within the slideway 297 by means of a pair of elongated retainer plates 299 and 300, screw fastened to the front faces 301 and 302 of the outstanding leg portions 303 and 304 of the U-shaped slideway 297. The plates 299 and 300 being of sufficient width to engage a portion of the front face of the slide 298, as shown in FIG. 10, to maintain the slide 298 within the slideway 297.

For advancing and retracting the quill 272 and thereby the cutter 33, a cylinder 307 is secured to the housing 271 by means of a plurality of screws 308 which extend through suitable lugs 309 formed on the cylinder 307 and threadedly engage the housing 271. A piston 310, schematically shown in FIG. 13, is supported for reciprocation within the cylinder 307. The piston 310 is provided with a piston rod 311, the free end of which extends outwardly of the cylinder 307 and is secured to the bracket 291, in a well known manner. Thus, by applying fluid pressure to the head side of the piston 310, the bracket 291 is urged downwardly to thereby advance the quill 272 and cutter 33 toward the workpiece.

To effect predetermined positioning of the cutter 33 relative to individual workpieces in a manner that the cutter 33 may operate to remove the same precise amount of material from each individual workpiece regardless of a variation in the height dimension of each workpiece presented thereto, there is provided a gauge mechanism generally denoted at 315. The gauge mechanism functions to establish the position of the cutter 33 relative to the upper surface of the workpiece by automatically stopping the advancement of the quill 272 toward the workpiece when the cutter has reached the desired position. The workpiece, as previously mentioned, when positioned in the work fixture 28, by operation of the transfer mechanism 215, will be positioned so that it will not be directly below the cutter 33 but is located to the right of the cutter, as shown in FIG. 3, so that the cutter may be moved to a position relative to the surface 20 of the workpiece and, also, so that the gauge mechanism 315 will contact the surface 20 thereof. The gauge mechanism 315 comprises a valve housing 316 which is secured to the slide 298 by means of yoke 317 through which a plurality of screws 318 are inserted into threaded engagement with the slide 298 to secure the housing 316 to the slide 298 for movement with it. To effect movement of the slide 298 upwardly or downwardly, as viewed in FIG. 9, a piston and cylinder mechanism, generally denoted at 320, is provided. A cylinder 321 of the piston and cylinder mechanism 320 is mounted on a carrier plate 322 by a plurality of screws as at 323. The carrier plate 322 is welded or otherwise secured to the top end surfaces of the retainer plates 299 and 300 and extend outwardly thereof, as shown in FIGS. 9 and 10. Additional support is given to the extending carrier plate 322 by means of a pair of relatively short supporting bars 324 and 325 which are welded to the front faces of the retaining plates 299 and 300, respectively. The cylinder 321 contains a piston 326, diagrammatically shown in FIG. 13 for reciprocation therein. The piston 326 has a piston rod 327 secured to it, which extends outwardly of the cylinder 321 and through a suitable opening in the carrier plate 322 and is threadedly engaged, as at 328, in an extending arm 329 of an L-shaped bracket 330. The bracket 330 is secured to the slide 298 by means of screws 331 which are inserted through suitable openings provided in the bracket into threaded engagement with the slide. Thus, with the cylinder 321 being secured to the bracket 291, and thereby being fixed relative to the slide 298, fluid pressure on the head side of the piston 326 will effect movement of the slide downwardly to thereby produce a like movement of the gauge mechanism 315.

As stated, the gauge mechanism 315 comprises the valve body 316 in which is movably supported a valve plunger 335, schematically shown in FIG. 13. The valve plunger 335 is provided with a pair of spaced cannelures 336 and 337 which operate to connect ports 338 and 339 together and ports 340 and 341 together when the valve plunger 335 is in the lower position, as shown in FIG. 13. The valve plunger 335 is also provided with a pair of passages 342 and 343 which operate, when the valve plunger is in its uppermost position, to connect the ports 338 and 341 together and the ports 339 and 340 together, respectively. The valve plunger 335 when positioned intermediate its lower and upper positions functions to block the ports 338, 339, 340 and 341.

To actuate the valve plunger 335 to its various positions, there is provided a feeler rod 345 which is supported for axial movement in a housing 346 secured to the lower end of the valve body 316. The outwardly extending end of the rod 345 is provided with a hardened tip 347 which is adapted to engage the surface of the workpiece upon which the cutter 33 is to operate. The inner end of the rod 345 extends through an opening provided in the end of the body 316 into engagement with the end surface of the valve plunger 335. A compression spring 348 is mounted about the rod 345 and abuts the end of the body 316 while the opposite end bears against an annular flange or washer 349 secured to the rod 345, as shown in FIG. 13. In this manner, the rod 345 is positively biased outwardly to permit the valve plunger 335 to be normally positioned in its lowermost position, as shown in FIG. 13.

To effect a setting of the gauge mechanism 315 relative to the cutter 33 there is provided a simple adjusting mechanism 350 by which means it is possible to set the gauge mechanism so that it is effective to control the positioning of the cutter 33 to any predetermined position relative to a workpiece. To this end, a block 351 is secured to the lower end of the bracket 291. The block 351 extends outwardly from the bracket 291 to a point beyond the slide 298, as shown in FIGS. 9 and 13. The block 351 is provided with a threaded opening 352 in which a screw 353 is engaged so that the end 354 thereof engages the end surface 355 of the slide 298. By adjusting the screw 353 inwardly or outwardly in the block 351 the limit to which the slide 298 and its associated gauge mechanism may be advanced is controlled.

To effect an adjustment in the relative setting of the cutter 33 and the gauge mechanism 315 it is necessary to advance the cutter 33 to the position it is desired that the cutter have relative to a workpiece that it is to operate upon. When this position has been attained the slide 298 is advanced to engage the tip 347 of the rod 345 with the surface of the workpiece. The advancement of the slide 298 then continues until the rod 345 moves the valve plunger 335 to its intermediate position. When the valve plunger 335 has been moved to its intermediate position, the advancement of the slide 298 is stopped. At this time the screw 353 is then adjusted inwardly or outwardly of the block 351, as the case may be, until the end 354 of the screw engages the surface 355 of the slide 298. This setting will govern future advancements of the cutter 33 in respect to other workpieces. Thus, the cutter 33 when advanced to an operating position relative to other workpieces will always be positioned so as to remove the same amount of material from the workpieces, regardless of a variation in the height dimensions of the individual workpieces. At this point it may be well to state that the movement of the valve plunger 335, shown schematically in FIG. 13, has been greatly exaggerated in the interest of clarity. However, in actual practice the amount of movement of the plunger will be relatively small.

To effect a positive locking of the quill 272 in an advanced position there is provided a locking mechanism, generally denoted at 360, which is operative to move a portion of the housing 271 into tight frictional engagement with the quill 272. To this end, as shown in FIGS. 11 and 12, the housing 271 adjacent the cutter 33 has a portion 361 which is semi-detached from the body of the housing. The portion 361 remains attached to the main body of the housing at one end, as clearly shown in FIG. 12. In this manner, the portion 361 constitutes a resilient band that encompasses approximately a quarter of the circumference of the quill 272. A boss 362 integrally formed on the portion 361 at the free end thereof supports a stud 363 which is threadedly engaged in another boss 364 integrally formed on the main body of the housing 271 adjacent the free end of the portion 361. The stud 363 at its outer end is provided with a threaded portion 365 on which a nut 366 is engaged. An arm 367 having one end secured to the nut 366, as by welding, extends outwardly thereof to function as a lever arm for tightening or loosening the nut 366 on the threaded portion 365 of the stud 363. To actuate the arm 367 upwardly or downwardly for operation of the nut 365, a fluid actuator 368 is provided. The fluid actuator 368 comprises a cylinder 369, one end of which is pivotally secured, as at 370, to a depending bracket 371 secured to the housing 271. Supported within the cylinder 369 for reciprocation is a piston 372, diagrammatically shown in FIG. 13, having a piston rod 373, the free end of which is pivotally connected to the extending end of the arm 367, as at 374. It will be noted that the showing made of the position of the actuator 368 and the arm 367 of the clamp mechanism 360 in FIG. 13 is reversed 180° relative to the position they occupy, as shown in FIG. 12. Therefore, in FIG. 12 the extending end of the arm 367 will be caused to move upwardly in effecting a clamping action, while in FIG. 13 the arm 367 is depicted as extending in the opposite direction and therefore, in this showing, the arm 367 must move downwardly to effect the clamping action. In either showing the nut 366 to which the arm 367 is connected will be rotated in a clockwise direction in effecting a clamping action. Thus, by supplying fluid pressure to the rod end of the piston 372 the arm 367 will be moved upwardly to the position it occupies in FIG. 12, to effect a tightening of the nut 366 on the stud 363. The nut 366 upon being tightened on the stud exerts a force upon the end of the boss 362 thereby urging the entire band portion 361 of the housing into tight frictional engagement with the quill 272 to clamp it in position. To unclamp the quill, fluid pressure is applied to the head side of the piston 372 to move the arm 367 downwardly and effect a loosening of the nut 365 on the stud 363, thereby releasing the force exerted on the boss 362 to permit the portion 361 of the housing 271 to resiliently return to its normal position.

A complete independent hydraulic circuit has been provided to supply fluid under pressure to the actuator 290 of the quill 272, the actuator 320 of the gauge mechanism 315 and the actuator 368 of the quill clamping mechanism. The hydraulic circuit in conjunction with various valves and switches functions to automatically actuate and control the advancement and retraction of the cutter 33 in a complete cycle of operation.

Fluid pressure is supplied to the actuator 320 from a reservoir 380 through a supply line 381 connected to the inlet side of a pump 382. From the pump 382 fluid under pressure is directed through a line 383, a check valve 384 and a line 385 to a distribution valve 386 which operates to direct fluid pressure to one side or the other of the piston 326 of the actuator 320.

The valve 386 comprises a valve body 387 having four ports 388, 389, 390 and 391. A movable plunger 392 is contained within the valve body 387 and is normally maintained in a leftward position, as viewed in FIG. 13, by a spring 393 interposed between the end face of the plunger 392 and the end of the valve body 387. In the normal or leftward position the plunger 392 directs fluid pressure to the rod side of the piston 326 of the actuator 320. The plunger 392 is positionable rightwardly, to the position it occupies, as shown in FIG. 13, by a solenoid 394.

For the purpose of selectively passing fluid pressure through the valve 386 the plunger 392 is provided with two cannelures 395 and 396. The cannelures 395 and 396 serve as connecting passages between the ports 388 and 390, and ports 389 and 391, respectively, when the plunger 392 is in its normal leftward position. Internally formed in the plunger 392 are two passages 397 and 398 which connect the ports 388 and 391 together and the ports 389 and 390 together, respectively, when the solenoid 394 has been energized to move the plunger 392 rightwardly to the position it occupies, as shown in FIG. 13. The port 390 of the valve 386 is connected to a chamber 399 on the rod side of the piston 326 of the actuator 320 by a line 401; while the port 391 of the valve is connected to a chamber 402 on the head side of the piston 326 of the actuator 320 by the lines 403 and 404. The port 389 of the valve 386 serves as an exhaust port and is connected to the reservoir 380 by a line 405, a speed control valve 406 and a line 407. The speed control valve 406 serves to regulate the rate at which fluid from either of the chambers 399 or 402, of the actuator 320, is exhausted to the reservoir and thereby controls the rate at which the gauge mechanism 315 is advanced or retracted.

Fluid pressure is supplied to the actuator 290 from the pump 382 by a line 410 connected to the pressure line 383, a line 411, a check valve 412, and a line 413 connected to another distributor valve 415 which operates to direct the fluid pressure to one side or the other of the piston 310 of the actuator 290.

The valve 415 is similar to the valve 386 and comprises a valve body 416 having four ports 417, 418, 419 and 420. A movable plunger 421 is contained within the valve body 416 and is normally maintained in a rightward position, as viewed in FIG. 13, by a spring 422 interposed between the end face of the plunger 421 and the end of the valve body 416. In its normal or rightward position the plunger operates to direct fluid pressure to the rod side of the piston 310 of the actuator 290. The plunger 421 is positionable leftwardly, to the position it occupies, as shown in FIG. 13, by a solenoid 423.

For the purpose of selectively passing fluid pressure through the valve 415 the plunger 421 is provided with a pair of cannelures 424 and 425. The cannelures 424 and 425 serve to connect the ports 417 and 419 together, and the ports 418 and 420 together, respectively, when the plunger 421 is in its normal or rightward position. Internally formed in the plunger 421 are two passages 426 and 427 which connect the ports 417 and 420 together, and the ports 418 and 419 together, respectively, when the solenoid 423 has been energized to move the plunger leftwardly to the position it occupies in FIG. 13. The port 419 of the valve 415 is connected to a chamber 428 on the rod side of the piston 310 of the actuator 290 by a line 429, a pilot operated check valve 430, and a line 431. The pilot operated check valve 430 is of the type that normally permits fluid to flow through it in the direction indicated by the arrow, and normally does not permit a reverse direction of flow. However, when the line 403 is pressurized, pilot pressure will be supplied to the valve 430 to maintain it in an open condition thereby allowing fluid to flow through it in a reverse direction. The port 420 of the valve is connected to the port 338 of the gauge mechanism 315 by a line 432, while the port 418 of the valve 415 is connected to the port 341 of the gauge mechanism 315 by a line 433. The port 339 of the gauge mechanism is connected to a chamber 434 on the head side of the piston 310 of the actuator 290 by a line 435, a pilot operated check valve 436 and a line 437. The pilot operated check valve 436 is similar to the valve 430 and normally operates to permit fluid to flow through it in the direction indicated by the arrow. However, for fluid to flow through it in a reverse direction the valve must be held open by pilot pressure which in this instance will be obtained from the line 403 when it is pressurized. The port 340 of the gauge mechanism 315 serves as an exhaust port to the reservoir 380, for fluid exhausted from either side of the piston of the actuator 290. The port 340 is connected to the reservoir 380 by a line 438, a speed control valve 439, a line 440, a check valve 441 and a return line 442. The speed control valve 439 serves to control the rate at which fluid from the actuator 290 is exhausted to thereby effect a control of the rate at which the quill 272 is advanced or retracted.

The actuator 368 of the locking mechanism 360 is also supplied with fluid pressure from the pump 382. To this end a line 444, connected to the pressure line 410, is connected to a distribution valve 445 which operates to direct fluid pressure to one side or the other of the piston 372 of the actuator 368.

The valve 445 comprises a valve body 446 having four ports 447, 448, 449 and 450 therein. A movable plunger 451 is contained within the valve body 446 and is positionable either in the leftward position that it occupies in FIG. 13, by a solenoid 452, or in a rightward position by a solenoid 453. The plunger, when positioned as shown, operates to direct fluid pressure to a chamber 454 on the head side of the piston 372 of the actuator 368 and when positioned rightwardly directs the fluid pressure to a chamber 455 on the rod side of the piston.

For the purpose of passing fluid pressure through the valve 445 the plunger 451 is provided with a pair of cannelures 456 and 457. The cannelures 456 and 457 serve as connecting passages between the ports 447 and 449 and the ports 448 and 450, when the plunger 451 is in the leftward position. Internally formed in the plunger 451 are two passages 458 and 459 which connect ports 447 and 450 together, and ports 448 and 449 together, respectively, whenever the solenoid 453 is energized to position the plunger rightwardly. The port 449 of the valve 445 is connected to the chamber 454 of the actuator 368 by a line 460. The port 450 of the valve 445 is connected to the chamber 455 of the actuator 368 by a line 461. The port 448 of the valve serves as an exhaust port and is connected to the return line 442 by a line 462.

For a clear understanding of the operation of the tool unit 31 a description of a complete operating cycle of the unit will be given with reference to FIG. 13. As shown in FIG. 13, the broken line "X" will be assumed to represent the top surface 20 of the workpiece upon which it is desired that the cutter 33 operate upon. The solid line "Y" will represent the finished surface that it is desired that the workpiece shall have after the cutter has operated upon the workpiece. In this description the pump 382 will be considered to be constantly driven to maintain a constant supply of fluid pressure to the supply line 383. The position of the quill will be assumed to be shown in a fully retracted position and the slide 298 will be assumed to be shown in a fully retracted position on the bracket 291. It will also be assumed that the clamp mechanism 360 is in an unclamped condition. With these conditions as stated the rod 345 of the gauge mechanism 315 will be fully extended thereby allowing the plunger 335 to assume its lowermost position whereby the ports 338 and 339 are connected via the cannelure 336, and the ports 340 and 341 are connected via the cannelure 337.

To initiate an action of the tool unit 31 the solenoid 394 of the valve 386 is energized by suitable means (not shown), such as a switch or by a plurality of limit switches interconnected in series, as desired. Energization of the solenoid 394 will effect rightward positioning of the plunger 392 to the position shown in FIG. 13. Oil will then flow from the supply port 388 of the valve 386 through the passage 397 and out through the port 391. From the port 391 fluid pressure will flow through the lines 403 and 404 into the chamber 402 of the actuator 320 to advance the slide 298 and thereby the gauge mechanism 315. Fluid that is exhausted from the chamber 399 of the actuator 320 will pass through the line 401 into port 390 of the valve 386 and by means of the passage 398 in the plunger 392 will flow out through the port 389. From the port 389 the exhaust fluid will return to the reservoir 380 via the line 405, the valve 406 and the line 407. The valve 406 having been preset will regulate the rate at which the slide 298 is advanced. The slide 298 will be advanced until the end surface 355 thereof engages the screw 353, which has been preset as previously described. When the slide has been fully advanced an adjustable dog 465, adjustably mounted on the gauge mechanism 315, as schematically shown as being mounted on the rod 327 in FIG. 13, actuates a limit switch 466, shown in FIG. 10 to energize the solenoid 423 of the valve 415.

The solenoid 423 upon being energized will position the plunger 421 of the valve 415 leftwardly to the position shown in FIG. 13. Fluid pressure, from the supply line 383, will now flow through the lines 410 and 411 through the check valve 412 and the line 413 into the valve 415 via the port 417. Fluid pressure will continue through the valve 415 via the passage 426 and out of the valve through the port 420 into the line 432. From the line 432 fluid pressure will enter port 338 of the gauge mechanism 315 and by means of the cannelure 336 will pass out through the port 339 into the line 435. Fluid pressure in the line 435 will pass through the pilot operated check valve 436 into the line 437 to the chamber 434 of the actuator 290. The check valve 436 is maintained open by fluid pressure from a piliot line 467 connected to the line 403 and the valve, the line 403 at this time receiving fluid pressure from the valve 386. To maintain the valve 436 open the fluid supplied to the pilot connection of the valve is at a higher pressure than that flowing through the main part of the valve from the line 435. This is accomplished by the action of the check valve 412 at the inlet side of the valve 415.

Fluid pressure in the chamber 434 of the actuator 290 will effect advancement of the quill 272 and thereby the spindle 273 and cutter 33. Since fluid pressure is continued to the chamber 402 of the actuator 320 the gauge mechanism 315 will also advance together with the quill 272.

Fluid in the chamber 428 of the actuator 290 will exhaust to the reservoir 380 via the line 431, the pilot operated check valve 430, the line 429 through the valve 415 via the port 419, the passage 427 and port 418. From the port 418 exhaust fluid will continue on through the line 433 to the gauge mechanism 315 and pass therethrough via the port 341, the cannelure 337 and the port 340 into the line 438. Fluid exhaust will continue on through the speed control valve 439, the line 440, the check valve 441 and the return line 442 to the reservoir 380. The speed control valve 439 in the exhaust circuit functions to control the rate at which the quill 272 is advanced. The pilot operated valve 430 is similar to the valve 436 and is maintained open by fluid pressure supplied to the valve by a pilot line 468 connected to the line 403, which is receiving fluid pressure from the valve 386 at this time thereby allowing the fluid exhaust from the chamber 428 to flow through the valve 430 in the direction contra to the direction of the arrow.

As the quill and gauge mechanism continue to advance, the rod 345 of the gauge mechanism will contact the surface 20 of the workpiece W, represented by the broken line "X" in FIG. 13. Upon further advancement of the quill and gauge mechanism the rod 345 will be moved inwardly into the valve housing 316 of the gauge mechanism 315. The rod 345 in moving inwardly into the gauge mechanism 315 contacts the plunger 335 moving it upwardly to its intermediate position. The plunger in moving to its intermediate position functions to progressively meter the flow of fluid pressure through the gauge mechanism, thus, gradually retarding the rate at which the quill 272 is advanced. When the cutter 33 has been advanced to the desired position, represented by the full line "Y" in FIG. 13, the plunger 335 will have been moved upwardly to its intermediate position blocking the flow of fluid pressure through the ports 338 and 339 and also blocking the flow of exhaust fluid through the ports 341 and 340 thereby stopping the positive advancement of the quill 272. However, due to the weight of the quill 272 and associated mechanisms the quill may tend to drift, thereby moving the cutter 33 to a position below the full line "Y," which represents the desired position. In this event the rod 345 will be moved further inwardly in the valve body 316 thereby moving the plunger 335 to its uppermost position. In this position the inlet port 338 will be connected to the port 341 via the passage 342, and the port 339 will be connected to the exhaust port 340 via the passage 343. Fluid pressure will then flow from the line 432 through the gauge mechanism 315 via the port 338, the passage 342, and the port 341 to the valve 415 via the line 433. Fluid pressure will enter the valve 415 via the port 418 and pass through and out via the passage 427 and the port 419 into the line 429. The fluid pressure will then be directed to the chamber 428 of the actuator 290 via the line 429, the pilot operated check valve 430 and the line 431. Fluid pressure in the chamber 428 of the actuator 290 will effect a retraction of the quill 272 to move the cutter 33 upwardly into the desired position. As the quill 272 retracts, the gauge mechanism 315 will also be retracted with it thereby allowing the rod 345 to move outwardly of the valve body 316 with a corresponding downward movement of the plunger 335.

At this time fluid exhaust from the chamber 434 of the actuator 290 will be directed to the port 339 of the gauge mechanism 315 via the line 437, the check valve 436 and the line 435. The exhaust fluid will enter port 339 and flow out through port 340 via the aligned passage 343 in the plunger 335. From the port 340 the exhaust fluid will return to the reservoir 380 via the line 438, the valve 439, the line 440, the check valve 441 and the return line 442.

When the quill 272 has been retracted a sufficient distance to effect a repositioning of the cutter 33 into the desired position relative to the workpiece, the plunger 335 will have also been repositioned to its intermediate position to block the flow of fluid pressure to the chamber 428 of the actuator 290 thereby stopping movement of the quill 272.

As the quill 272 is advanced in a positioning movement an adjustable dog 469, shown mounted on the side of the leg 303 of the U-shaped slideway 297 in FIG. 10, and shown schematically in FIG. 13 as being attached to the rod 311, actuates a limit switch 470 clockwise to start an electrical timer (not shown) which is electrically connected to the solenoid 453 of the distribution valve 445. The timer (not shown) is set to run for a period of time that is sufficient to allow the cutter 33 to be moved to the desired position which includes a time period necessary to permit retraction of the quill in the event that the quill may drift past the desired position as described. When the cutter 33 has been positioned, and the timer (not shown) has run out, the solenoid 453 of the valve 445 will be energized to move the plunger 451 to a rightward position, as viewed in FIG. 13. Fluid pressure is then directed from the supply line 410 to the inlet port 447 of the valve 445 via the line 444. Fluid pressure entering the valve 445 via the port 447 is directed through the valve via the passage 458 to the port 450. From the port 450 fluid pressure is directed to the chamber 455 of the actuator 368 via the line 461 to actuate the quill clamping mechanism 360 to clamp the quill in place. At this time fluid in the chamber 454 of the actuator 368 is exhausted to the reservoir 380 via the line 460, the port 449, the passage 459, the port 448 and the line 462 into the return line 442.

As the actuator 368 actuates the clamping mechanism 360 in a clamping action, a limit switch 471 is actuated by means of a dog 472. The dog 472 is shown in FIG. 12, as being secured to the inner end of the arm 367 of the clamp mechanism 360, and in FIG. 13 the dog 472 is shown schematically and there appears as mounted on the piston rod 373. The limit switch 471 is electrically connected into the electric circuit of the solenoid 394 and when actuated in one direction by the dog 472, deenergizes the solenoid 394.

When the solenoid 394 has been deenergized, the plunger 392, by force of the spring 393, will be moved leftwardly. Fluid pressure entering the port 388 will flow through the valve 386 via the cannelure 395 and out through the port 390 into the line 401 to the chamber 399 of the actuator 320. Fluid pressure in the chamber 399 retracts the slide 298 thereby retracting the gauge mechanism 315 bodily and moves the dog 465 out of engagement with the limit switch 466 to release it. At this time fluid in the chamber 402 of the actuator 320 is returned to the reservoir 380 via the line 404, the line 403, the port 391, the cannelure 396, the port 389 of the valve 386, the line 405, speed control valve 406 and the line 407. Since the line 403 is now functioning as an exhaust line, fluid pressure is no longer supplied to the pilots of the valves 430 and 436 and they close and they are now conditioned to prevent the flow of fluid through them in a direction contra to the direction indicated by the arrows. The limit switch 466 when in a release position may be electrically connected into a circuit to a light a signal lamp to indicate full retraction of the gauge mechanism so that an operator may known that he is free to start the feed motion of the table; or the switch may be so connected as to actuate a feed movement of the table 140.

It is to be remembered that prior to the retraction of the gauge mechanism, the plunger 335 thereof is in its intermediate or fluid blocking position. Thus, the gauge mechanism 315 in being retracted bodily permits movement of the rod 345 outwardly of the valve body 316 allowing the plunger 335 to move to its lower position which connects the ports 338 and 339, together, via the cannelure 336. Therefore, fluid pressure in the line 432 would flow to the chamber 434 of the quill actuator 290 but is prevented from doing so by the now closed valve 436. Therefore, fluid pressure cannot now flow into the chamber 434 and the fluid therein cannot escape therefrom, due to pressure in the line 435. Likewise, fluid in the chamber 428 cannot escape due to the now closed valve 430. It is, therefore, apparent that in addition to the mechanical clamping previously described, hydraulic locking of the quill 272 in its operating position has been accomplished which is effective to prevent movement of the quill in either direction.

After the cutter 33 has operated upon the workpiece the solenoid 453 will be deenergized and the solenoid 452 of the valve 445 will be energized. This may be accomplished in a well known manner such as by a limit switch 475, shown in FIG. 3, electrically connected to control the solenoids 452 and 453, and actuated by the workpiece supporting table 140 at the end of its feed stroke. When the solenoid 453 of the valve 445 is deenergized and the solenoid 452 thereof energized, the plunger 451 will be moved leftwardly into the position, shown in FIG. 13. Fluid pressure entering the valve 445 through port 447 will be directed via the cannelure 456, port 449, and line 460 into the chamber 454 of the clamp actuator 368 to unclamp the quill 272. At this time a dog 476, shown in FIG. 12, as being secured to the inner end of the arm 367 of the clamp mechanism 360, opposite the dog 472, and schematically in FIG. 13 as mounted on the piston rod 373 will actuate the limit switch 471 in the opposite direction to deenergize the solenoid 423 of the valve 415. The plunger 421 therein will be moved to a rightward position, as viewed in FIG. 13. Fluid pressure will now flow through the valve 415 via the cannelure 424 and port 419 into the line 429. Fluid pressure will then pass into the chamber 428 of the actuator 290 via the check valve 430, which normally permits fluid to flow through it in the direction indicated by the arrow, and line 431 to effect retraction of the quill 272. Since the valve 415 has been repositioned, the flow of fluid pressure to the chamber 434 of the actuator 290, via the gauge mechanism 315, will be discontinued. Therefore, exhaust fluid from the chamber 434 will flow through the line 437, the valve 436 and line 435 to the gauge mechanism 315. The exhaust fluid will enter port 339 and flow out through the port 338 via the cannelure 336 into the line 432. From the line 432 the exhaust fluid will enter port 420 of the valve 415 and pass through the valve via the cannelure 425 and out through port 418 into the line 433. The exhaust fluid in the line 433 will enter port 341 of the housing 316 and pass through via cannelure 337 and port 340. From the port 340 fluid exhaust will continue on through the line 438, valve 439, line 440, check valve 441 and return to the reservoir 380 via the line 442. When the quill 272 has been fully retracted a dog 477, schematically shown in FIG. 13 as being mounted on the piston rod 311 of the actuator 290, will actuate the limit switch 470 in the opposite direction to deenergize solenoid 452 of the valve 445 to complete a cycle of operation of the tool unit.

To continue with the description of the machine, the tool units 41 and 42, in the work station 23, are disposed in a manner so that the cutter 38 and 38a thereof will operate upon the side pads 21 of the workpieces W. The tool units 41 and 42 are identical in all respects and it is therefore deemed sufficient to described the tool unit 42.

As best shown in FIGS. 1 and 2, the tool unit 42 comprises a frame 485 secured to the upwardly inclined top surface 486 of the extension 54. Integrally formed with the frame 485 is a quill housing 487 in which a quill 488 is supported for axial movement, in a well known manner. The quill 488 rotatably supports a spindle 489 having the cutter 38a secured thereto. An electric motor 490 is mounted on a supporting platform 491 secured to the top frame 485. The motor 490 is connected to rotatably drive the spindle 489 through a belt transmission 492 in the usal manner. The quill 488 is actuated axially to advance the cutter 38a into a work position by a fluid actuator (not shown).

The several operating mechanisms of the machine tool herein described are electrically controlled with the various electrical circuits (not shown) which may be actuated selectively by manipulating a plurality of switches mounted in a switch box 495. The switch box 495 is secured to the side of the frame extension 58, shown in FIG. 1, and constitutes the operators station. The that an automatic cycle of operation may be initiated by actuation of an automatic cycle start switch (not shown) on the switch box 495. The electrical circuits have not been shown nor described since they form no part of the present invention.

To describe an operational cycle of the entire machine it must be assumed that workpieces shown in stations 22 and 23, FIG. 3, are workpieces to be operated upon and that the workpieces shown in the loading station 24 are to be placed therein and, also, that the transfer mechanism 215 is in its leftward position indicated by the dotted lines, shown in FIG. 3, which position is its normal position. It must also be assumed, for purposes of this operational description, that two workpieces are in the receiving and delivery station 25.

An automatic cycle of operation may be initiated by an operator actuating the automatic cycle switch (not shown) on the panel 495. Upon actuation of the automatic cycle switch three things will occur simultaneously. One, the workpieces in the fixtures 28 and 29 are clamped therein by action of the fingers 198 and 199. Two, the workpieces in the fixtures 36 and 37 are clamped therein by the upward movement of the piston 209 which moves the workpiece against the pad 211. Third, the loading mechanism 26 will begin to operate. In this respect the motor 97, shown in FIGS. 1 and 8, operates to rotate the loading arm 85 into a receiving position so that the fingers 83 and 84 thereof are positioned to face the carriage 60. When the arm 85 is rotated into the receiving position a limit switch 496 is actuated in one direction by an end 497 of a bar 498 secured for rotation on an extending end 513 of a drive shaft 499 of the motor 97. The limit switch 496 upon being actuated by the end 497 of the bar 498 is operative, after a time delay to insure complete positioning of the arm 85, to effect operation of the carriage actuator 80 in a direction to move the carriage 60 from a retracted position, shown in broken lines in FIG. 8, leftwardly to the position as indicated in full lines in FIG. 8. The carriage 60 upon being moved leftwardly carries the workpiece W towards the loading arm 85 in a manner that the workpiece W is inserted between the lower and upper fingers 83 and 84, respectively, of the arm. In inserting the workpiece between the fingers 83 and 84 the carriage 60 locates the workpiece therein against the rail portion 56b, shown in FIGS. 7 and 8, which is functioning as a locating stop. When the carriage has been fully advanced a dog 501 will actuate a limit switch 502 to reverse the operation of the motor 97 and rotate the arm 85 to place the workpiece in the loading station 24 upon the rail 57, as shown in FIGS. 3, 7 and 8. When the loading arm 85 is rotated to the load position, the limit switch 496 is actuated in the opposite direction by an end 503 of the bar 498 to effect a reversal of the direction of action of the actuator 80 to retract the carriage 60. Upon retraction of the carriage 60 a dog 505, secured to the side of the carriage, will actuate a limit switch 506, to partially condition the actuator 80 for another operation.

Actuating the limit switch 496 in the opposite direction will also effect operation of the actuator 120 to operate the shuttle mechanism 27 for advancing the workpiece from the position adjacent the loading mechanism 26 to a lead position, thus, clearing the way for another workpiece. When the arm 104 of the shuttle mechanism 27 reaches its foremost position, a limit switch 504 will be actuated thereby. When both the limit switches 506 and 504 have been actuated, the actuator 120 will have been conditioned to return the shuttle mechanism 27 to its retracted position. The arm 104 in the retracted position will depress a limit switch 507. Actuation of the limit switches 506 and 507 will also condition the actuator 97 to again rotate the arm 85, to a receiving position. As in the previous action of the arm 85, the limit switch 496 will again be actuated to initiate action of the carriage actuator 80 to advance the carriage and insert another workpiece within the fingers 83 and 84 of the arm. Likewise, advancement of the carriage 60 will again depress the limit switch 502 to condition the actuator 97 to rotate the arm 85 to place the workpiece in the loading station 24. At this time operation of the shuttle mechanism 27 is prevented by action of a limit switch (not shown) which has previously been depressed by a workpiece on a load mechanism feed conveyer (not shown) adjacent the carriage 60.

When the arm 85 has been rotated a second time to load a second workpiece into the loading station and consequently actuating the limit switch 496 a second time in the opposite direction the motor 260 of the transfer mechanism 215 will be conditioned to return the bar 216 from the position indicated by broken lines, to the position that it occupies, as shown in FIG. 3. When the bar has been moved to the retracted position the operation of the motor 260 will be stopped by the bar depressing a limit switch (not shown).

When the operator actuates the automatic cycle start switch, the motor 138 operably connected to bodily rotate the conveyer 44 is started, to rotate the conveyor 44 out of alignment with the rails 152 and 153 to a delivery area (not shown). When the conveyer 44 is rotated to the delivery area a dog 508 on the conveyer frame 44, shown in FIG. 3, actuates a limit switch 509 in one direction, which, when one or the other of two other limit switches 510 or 511 have been actuated closed, effects operation of the motor 139 connected to drive the rollers 45 of the conveyer. The limit switches 510 and 511 are secured to the frame 134 in position so that workpieces transferred to the conveyer will depress the limit switches to a closed position. The rollers 45, upon being driven, operate to move the workpieces on the conveyer into the delivery area (not shown). Upon the release of the limit switches 510 and 511 which are released by movement of the workpieces off of the conveyer, the motor 139 is stopped and the operation of the motor 138 is reversed to rotate the conveyer 44 back into the line. As the conveyer 44 is returned into the line the limit switch 509 will be acuated in the opposite direction to condition the electrical circuit for a subsequent cycle.

When the workpieces in the fixtures 28, 29, 36 and 37 have been clamped and associated limit switches (not shown) depressed, the solenoid 394 of the valve 386 of the tool units 31 and 32, the operation of which has been previously described, will be energized to position the cutters 33 and 33a, respectively, into the desired position. Simultaneously therewith the cutters 38 and 38a of the tool units 41 and 42, respectively, will be positioned to effect an operation upon the side pads 21 of the workpieces in the fixtures.

When the cutters of the tool units 28, 29, 36 and 37 are in a work position the table actuator 147, shown in FIG. 4, will be caused to operate to feed the table 140 to the left, as viewed in FIG. 3, to feed the workpieces past their respective cutters. Upon completion of the table feed movement, the limit switch 475 will be actuated by the left end of the table 140 to effect de-energization of the solenoid 453 and energization of the solenoid 452 of the valve 445 to thereby release the quill clamping mechanism 360, previously described, of the tool units 31 and 32 and also to release the clamping mechanisms (not shown) of the quills of the tool units 41 and 42 as well as to retract the cutters thereof. When the quill clamping mechanism 360 has operated to unclamp the quill 272, the limit switch 471 will be actuated in the opposite direction by the dog 476 to effect retraction of the quill and cutter thereof. Actuation of the limit switch 475 will also effect an unclamping of the workpieces in the work fixtures. When the cutters 33, 33a, 38 and 38a have been retracted and the clamping mechanism of the fixtures 28, 29, 36 and 37 unclamped, the actuator 147 of the table 140 will be conditioned to retract the table to its initial start position. The actuation of the limit switch 475 by the table 140, will, also, effect operation of the motor 240 of the finger bar 229 to lower the fingers 231 through 236 into engagement with the workpieces in the stations 24, 22 and 23.

When the table 140 has been retracted it depresses a limit switch 512 which conditions the motor 260 to advance the transfer mechanism 215 leftwardly, as viewed in FIG. 3. The transfer mechanism in moving leftwardly advances the workpieces in the work station 23 into the receiving and delivery station 25, while advancing the workpieces from the work station 22 into the vacated work station 23 and simultaneously therewith advances new workpieces from the loading station 24 into the work station 22. While being transferred to the next adjacent stations the workpieces are guided in a straight line movement by the guide rails 152 and 153 which are rigidly supported by the transient lateral and bottom rail supports 155, 156, 157 and 158. Since the transient supports react on the guide rails 152 and 153 below the plane in which the workpieces are supported there is no structure, other than the fixtures, which will interfere with the operation of the tool units 31, 32, 41 and 42 nor with the transfer mechanism 215.

Movement of the transfer bar to its extreme leftward position, to complete a transfer of the workpieces, actuates another limit switch (not shown) which conditions the motor 240 for operation in a reverse direction to raise the fingers 231, 232, 233, 234, 235 and 236 in the position indicated by the broken lines and completes a cycle of operation.

Although the illustrative embodiment of the invention has been described in considerable detail for the purpose of disclosing a practical operative structure whereby the invention may be practiced advantageously, it is to be understood that the particular apparatus described is intended to be illustrative only, and that the various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a cutter positioning mechanism for a machine tool having a cutter carrying member movable towards and away from a workpiece, cutter propelling means operably connected to move said cutter carrying member in its path of travel, a gauge mechanism operably connected to said member for movement with it and for independent movement relative thereto to a position in advance of the cutter, said gauge mechanism being adapted to yield upon contact with a workpiece, a power source operably connected to move said gauge mechanism in its path of travel relative to said member, a first control mechanism operably connected to actuate said power source in one direction to advance said gauge mechanism, a second control mechanism operably connected to actuate said cutter propelling means in one direction to advance said cutter carrying member, the advancing action of said second control mechanism being initiated by said gauge mechanism upon completion of its independent advancing movement, other means operably connected to stop said cutter propelling means when actuated, said other means being adapted to be actuated upon a predetermined amount of yielding of said gauge mechanism by virtue of its engagement with the workpiece, and means operable to actuate said first control mechanism to effect operation of said power source in the opposite direction to retract said gauge mechanism.

2. In a machine tool for operating upon a workpiece, a head, a quill supported within said head for axial movement towards or away from the workpiece, a tool carrying spindle supported within said quill for axial movement with it and for independent rotation, means connected to rotate said spindle, a bracket secured to said quill, a slide on said bracket adapted for advancing and retracting movement in the direction in which said quill is movable, a gauge mechanism comprising a housing mounted on said slide for movement with it, a feeler rod yieldably carried by said housing and extending outwardly thereof in the direction of the workpiece, a first power source operably connected to said slide to advance or retract said gauge mechanism, a second power source operably connected to advance and retract said quill and said gauge mechanism simultaneously means operably connected to actuate said first power source to effect an advance movement of said gauge mechanism on said slide to a position ahead of the tool, means operably connected to initiate operation of said second power source to effect advancement of said quill with its associated spindle and said gauge mechanism when actuated by the independent advancement of said gauge mechanism to thereby engage said feeler rod with the workpiece, other means operably connected to stop the operation of said second power source when actuated by a predetermined amount of inward movement of said feeler rod into said housing by reason of its engagement with the workpiece to thereby effect a positioning of the tool relative to the workpiece, a clamping mechanism operably connected to clamp said quill in the predetermined position, and means operably connected upon the completion of the clamping action to effect operation of said first power source in the opposite direction to retract said gauge mechanism.

3. In an apparatus for positioning a cutter of a tool unit relative to a workpiece, cutter propelling means, operably connected to move said cutter towards or away from the workpiece, a gauge mechanism operably connected to move with the cutter and for independent movement relative to it, said gauge mechanism being in position to be moved into contact with the workpiece and said gauge mechanism also being constructed and arranged so as to be yieldable under contact pressure upon engagement with the workpiece, a power source operably connected to move said gauge mechanism in its path of travel, said gauge mechanism being adapted when moved independently towards the workpiece to be in a position in advance of the cutter, individual control mechanisms connected to said cutter propelling means and power source to actuate them selectively in one direction or the other, means operably connected to actuate the first of said control mechanisms to effect operation of said power source in a direction to advance said gauge mechanism towards the workpiece, means operably connected to actuate the second of said control mechanisms to effect operation of said cutter propelling means to advance the cutter and said gauge mechanism to engage said gauge mechanism with the workpiece, said gauge mechanism yielding upon engagement with the workpiece, means operable when actuated by said gauge mechanism after a predetermined amount of yielding thereof to actuate the second of said control mechanisms to stop the advancement of said cutter propelling means and thereby position the cutter relative to the workpiece in a predetermined position relative to the workpiece, and means operable to actuate the first of said control mechanisms to effect operation of said power source in a direction to retract said gauge mechanism from its engagement with the workpiece.

4. In a positioning mechanism for positioning a tool unit of a machine tool into a predetermined desired position relative to a workpiece, a tool carrying member movable towards or away from the workpiece, a gauge mechanism operably connected to said tool carrying member for movement with it and for independent movement towards or away from the workpiece, a feeler rod carried by said gauge mechanism for yielding movement relative to it, a first power source operably connected to said gauge mechanism to move it in either direction relative to said tool carrying member, a first means operably connected to effect operation of said first power source to move said gauge mechanism towards the workpiece and into a position whereby said feeler rod is in advance of the tool, a second power source operably connected to move said tool carrying member, a second means operably connected to effect operation of said second power source to move said tool carrying member and said gauge mechanism towards the workpiece to move said feeler rod into contact therewith, a third means operably connected to stop the operation of said second power source to thereby stop the advancement of said tool carrying member, said third means being disposed in a position to be actuated by said feeler rod after a predetermined amount of yielding of said feeler rod, and means operably connected to effect operation of said first power source in the opposite direction to retract said gauge mechanism.

5. In a tool unit, a head, a tool carried by said head for operating upon a workpiece and adapted to be moved towards or away from the workpiece, a gauge mechanism operably connected to move with said tool and adapted to be moved independently towards the workpiece or away from it, a first power source operably connected to effect movement of said gauge mechanism in either direction, means operably connected to effect operation of said first power source to advance said gauge mechanism to a position ahead of said tool, a second power source operably connected to effect movement of said tool in either direction, second means operably connected to effect operation of said second power source to advance said tool and said gauge mechanism, movable means carried by said gauge mechanism to contact the workpiece and adapted to yield to it upon continued operation of said second power source, a third means operably connected to be actuated by said movable means after a predetermined amount of yielding thereof to stop said second power source to thereby position said tool in a predetermined position relative to the workpiece, a clamping mechanism operably connected to clamp said tool in the predetermined position, a fourth means operably connected to effect operation of said first power source in the opposite directon to retract said gauge mechanism, said fourth means being actuated by said clamping mechanism upon completion of a clamping action, and means operably connected to effect a release of said clamping mechanism and to effect operation of said second power source to retract said tool when actuated.

6. In a machine tool for operating upon a workpiece, a head, a quill supported within said head for axial movement towards and away from the workpiece, a tool carrying spindle supported within said quill for axial movement with it and for independent rotation, a gauge mechanism operably connected to said quill for movement with it and for independent movement in a direction parallel to the direction of movement of said quill, a feeler rod movably carried by said gauge mechanism and disposed to extend outwardly thereof in a direction towards the workpiece, a first power source operably connected to said gauge mechanism to effect independent advancement or retraction of said gauge mechanism, a second power source operably connected to effect advancement or retraction of said quill and thereby said spindle and said gauge mechanism, means operably connected to effect an operation of said first power source to advance said gauge mechanism to position said feeler rod ahead of the tool, means operably connected to effect operation of said second power source to advance said quill and said gauge mechanism when actuated upon the completion of the independent advancement of said gauge mechanism to thereby advance the tool towards the workpiece and engage said feeler rod with the workpiece, other means operably connected to stop the advancing operation of said second power source, said other means being actuated by said feeler rod when said rod has been moved in a reverse direction a predetermined amount by reason of engagement with the workpiece to thereby establish a predetermined positioning of the tool relative to the workpiece.

7. In a machine tool, a frame, a plurality of spaced apart aligned stations comprising a loading station and a receiving station and at least one intermediate work station, a plurality of tool units disposed in said work station and adapted to perform the same work operation upon a different workpiece simulateneously, each of said tool units comprising a housing, a quill mounted in said housing for axial movement towards or away from a workpiece, a tool carrying spindle carried in said quill for movement with it and for independent rotation, power means connected to rotate said spindle, a gauge mechanism operably connected to said quill for movement with it and constructed and arranged to be independently movable in the same direction relative to it, said gauge mechanism having a yieldable element extending outwardly thereof in position to contact a workpiece, a first power source connected to move said gauge mechanism to a position in advance of the tool of said spindle or to retract it, a second power source operably connected to move said quill and said gauge mechanism simultaneously to thereby advance said quill and said gauge mechanism towards an associated workpiece to engage said yieldable element of said gauge mechanism with the workpiece, and means operably connected when actuated to stop said second power source and thereby stop the advancement of said quill, said means being disposed so as to be actuatable by said yieldable element of said gauge mechanism when in contact with a workpiece and yielding thereto a predetermined amount to thereby position the tool units relative to their associated workpieces to perform the same metal removing operation regardless of a variation in the workpieces.

8. In a machine tool, a frame, a quill supported in said frame for axial movement towards a workpiece, a cutter carrying spindle carried by said quill for movement with it and for independent rotation, a yieldable feeler mechanism for engagement with the workpiece operably connected to said quill for movement with it and constructed and arranged so as to be independently movable relative to said quill in the direction that said quill is movable, said feeler mechanism when moved independently in a forwardly direction being disposed in advance of the cutter carried by said spindle and when moved in the opposite direction being disposed in a retracted position, a first power source connected to move said feeler mechanism independently, a second power source operably connected to move said quill and said feeler mechanism simultaneously to thereby engage said yieldable feeler mechanism with the workpiece, a first means operably connected to effect operation of said first power source to advance said feeler mechanism, second means operable upon completion of advancement of said feeler mechanism to effect operation of said second power source to advance said quill and said feeler mechanism, a third means operable when actuated by said feeler mechanism after a predetermined amount of yielding thereof upon engagement with the workpiece to stop said second power source to thereby stop the advancing movement of said quill and said feeler mechanism, a clamping mechanism operably connected to clamp said quill in the advanced position, and fourth means operably connected to condition said first means to effect operation of said first power source in the opposite direction to retract said feeler mechanism.

9. In a machine tool for operating upon a workpiece, a head, a quill supported in said head for axial movement, a tool carrying spindle supported in said quill for movement with it and for independent rotation, means connected to rotate said spindle, a gauge mechanism operably connected to said quill for movement with it and for independent movement relative to it, a first fluid actuator operably connected to move said gauge mechanism to a predetermined position in advance of the tool carried by said spindle and to retract it, a second fluid actuator operably connected to said quill to move it in its path of travel, a source of fluid pressure, a hydraulic circuit operably connected to said source and to said actuators, a first valve operably connected in said hydraulic circuit to direct fluid pressure to said first fluid actuator to move said gauge mechanism independently of said quill to its advance position, a second valve operably connected in said hydraulic circuit to direct fluid pressure to said second fluid actuator to advance said quill and said gauge mechanism, a feeler rod yieldably carried by said gauge mechanism and extending outwardly thereof in the direction of advancement in position to engage a workpiece upon the advancement of said quill and said gauge mechanism, a third valve within said gauge mechanism operably interposed in the hydraulic circuit between said second valve and said second fluid actuator and operable when actuated to interrupt the flow of fluid pressure to said second fluid actuator, said feeler rod being operably connected upon engaging the workpiece and yielding thereto to actuate said third valve to its interrupting position upon advancement of said quill to a predetermined position, means responsive to the positioning of the tool of said spindle to a desired position relative to a workpiece to effect a conditioning of said first valve to direct the flow of fluid pressure to said first fluid actuator to effect retraction of said gauge mechanism, and means responsive to a completion of a work operation to effect a conditioning of said second valve to direct fluid pressure to said second actuator to effect retraction of said quill and said gauge mechanism.

10. In a machine tool for operating upon a workpiece, a head, a quill supported within said head for axial movement, a tool carrying spindle supported within said quill for movement with it and for independent rotation, means connected to rotate said spindle, a bracket secured to said quill for movement with it and extending outwardly of said head, a slide on said bracket for movement with it and for independent movement in the same direction relative to it, a gauge mechanism supported on said slide for movement with it, a first fluid actuator operably connected to move said slide on said bracket relative to said quill, a second fluid actuator operably connected to simultaneously move said quill and its associated gauge mechanism in their path of travel, a source of fluid pressure, a hydraulic circuit connected to said source and to sad first and second fluid actuators, a first vlave operably connected when actuated to direct fluid pressure to said first fluid actuator to effect independent movement of said slide to thereby advance said gauge mechanism to a predetermined position relative to said quill, a second valve operably connected when actuated to direct fluid pressure to said second fluid actuator to advance said quill and said gauge mechanism simultaneously, a third valve carried by said gauge mechanism and interposed in said hydraulic circuit between said second valve and said second fluid actuator, said third valve being normally condition to permit the flow of fluid pressure from said second valve to said second fluid actuator to advance said quill and said gauge mechanism simultaneously, but operable when actuated to interrupt the flow of fluid pressure to said second fluid actuator, a rod yieldably carried by said gauge mechanism and extending outwardly of said gauge mechanism in position to contact a workpiece as said quill and said gauge mechanism are advancing simultaneously and operably associated with said third valve to condition said third valve to interrupt the flow of fluid pressure to said second fluid actuator to stop the advancement of said quill and said gauge mechanism when the workpiece is contacted, means operably connected to reposition said first valve to direct fluid pressure to the opposite side of said first fluid actuator to retract said slide and thereby said gauge mechanism, and means operably connected to reposition said second valve to direct fluid pressure to the opposite side of said second fluid actuator to retract said quill.

11. In a hydraulic positioning and control apparatus for a movable cutter carrying member of a machine tool adapted to be movable towards or away from a workpiece, a gauge mechanism operably connected to move with the member and adapted to be independently movable relative to it, a first hydraulic actuator operably connected to move said gauge mechanism independently, a second hydraulic actuator operably connected to move the movable member and said gauge mechanism simultaneously, a source of fluid pressure, a first valve connected to direct fluid pressure from said source selectively to one side or the other of said first hydraulic actuator for moving said gauge mechanism to an advanced or retracted position and normally positioned so as to maintain said gauge mechanism in the retracted position, a second valve connected to direct fluid pressure from said source selectively to one side or the other of said second hydraulic actuator for moving the movable member and its associated gauge mechanism simultaneously to an advanced or retracted position and normally positioned so as to maintain the movable member and said gauge mechanism in the retracted position, a third valve connected to receive the flow of fluid pressure from said second valve that is directed to move the movable member and its associated gauge mechanism to an advanced position, said third valve being normally open to permit the flow of fluid pressure therethrough for advancing the movable member and its associated gauge mechanism and operable when actuated to interrupt the flow of fluid pressure therethrough for terminating the advancement of the movable member and its associated gauge mechanism and to redirect the flow of fluid pressure to said second hydraulic actuator to move the movable member and its associated gauge mechanism to the retracted position, and a gauge finger carried by said gauge mechanism and biased outwardly thereof in the direction of advancement in position to contact the workpiece when the movable member and its associated gauge mechanism are advanced simultaneously, said gauge finger being connected to actuate said third valve when moved to a first position interrupting the flow of fluid pressure to said second actuator for terminating the advancement of the movable member and its associated gauge mechanism and to actuate said third valve when moved to a second position for redirecting the flow of fluid pressure to said second hydraulic actuator to move the movable member and its associated gauge mechanism to the retracted position, whereby said gauge mechanism may be advanced independently to position said gauge finger in advance of the cutter carried by the movable member and the movable member and said gauge mechanism may be advanced simultaneously towards the workpiece whereupon said gauge finger will contact the workpiece and be moved thereby to actuate said third valve to interrupt the flow of fluid pressure therethrough and thereby terminate the advancement of the movable member and said gauge mechanism to position the cutter of the movable member in a predetermined position relative to the workpiece and upon advancement of the movable member and its associated gauge mechanism to a position beyond the desired position said gauge finger will be moved to actuate said third valve to redirect the flow of fluid pressure to said second hydraulic actuator thereby retracting the movable member and said gauge mechanism whereupon said gauge finger is again urged outwardly of said gauge mechanism and said third valve will move to the interrupting position as the movable member and its associated gauge mechanism are being retracted to thereby terminate the retraction of the movable member and its associated gauge mechanism to position the cutter of the movable member in the predetermined position relative to the workpiece.

12. In a machine tool unit; a cutter carrying member movable toward or away from a workpiece; a gauge mechanism operably connected to said cutter carrying member for movement with it and for independent movement relative to it; cutter propelling means operably connected to said cutter carrying member to effect movement of the cutter toward or away from a workpiece; actuating mechanism operably connected to said gauge mechanism to effect its movement relative to said cutter carrying member; means operably connected to effect operation of said actuating mechanism to advance said gauge mechanism relative to said cutter carrying member to a position in advance of the cutter carried by said member; means operable upon advancement of said gauge mechanism to effect operation of said cutter propelling means to advance said cutter carrying member as said actuating mechanism is operating to advance said gauge mechanism to thereby maintain said gauge mechanism in advance of the cutter carried by said member so that said gauge mechanism will directly contact the workpiece before the cutter carried by said member is advanced to the same plane; and means operable to stop the operation of said cutter propelling means and of said actuating mechanism to thereby stop the advancement of said cutter carrying member and said gauge mechanism, said stop means being disposed so as to be actuated by said guage mechanism upon a predetermined amount of engagement with the workpiece.

References Cited in the file of this patent
UNITED STATES PATENTS

| | | |
|---|---|---|
| 2,430,760 | Daugherty | Nov. 11, 1947 |
| 2,445,433 | Holmstrom | July 20, 1948 |
| 2,508,281 | Miller et al. | May 16, 1950 |
| 2,572,756 | Plimmer et al. | Oct. 23, 1951 |
| 2,593,254 | Bowen et al. | Apr. 15, 1952 |
| 2,615,372 | Coffin | Oct. 28, 1952 |
| 2,664,790 | Strachan | Jan. 5, 1954 |
| 2,677,311 | Campbell | May 4, 1954 |
| 2,690,702 | Romans et al. | Oct. 5, 1954 |
| 2,745,167 | Cross | May 15, 1956 |
| 2,771,172 | Bergstrand | Nov. 20, 1956 |
| 2,792,921 | Sharpe | May 21, 1957 |